US011955060B2

(12) United States Patent
Tian et al.

(10) Patent No.: US 11,955,060 B2
(45) Date of Patent: Apr. 9, 2024

(54) DISPLAY SUBSTRATE AND DISPLAY DEVICE

(71) Applicants: CHENGDU BOE OPTOELECTRONICS TECHNOLOGY CO., LTD., Sichuan (CN); BOE TECHNOLOGY GROUP CO., LTD., Beijing (CN)

(72) Inventors: Donghui Tian, Beijing (CN); Rong Wang, Beijing (CN); Xiangdan Dong, Beijing (CN); Mengmeng Du, Beijing (CN); Fan He, Beijing (CN); Cong Fan, Beijing (CN); Yujing Li, Beijing (CN)

(73) Assignees: CHENGDU BOE OPTOELECTRONICS TECHNOLOGY CO., LTD., Sichuan (CN); BOE TECHNOLOGY GROUP CO., LTD., Beijing (CN)

( * ) Notice: Subject to any disclaimer, the term of this patent is extended or adjusted under 35 U.S.C. 154(b) by 50 days.

(21) Appl. No.: 17/781,395

(22) PCT Filed: May 21, 2021

(86) PCT No.: PCT/CN2021/095233
§ 371 (c)(1),
(2) Date: Jun. 1, 2022

(87) PCT Pub. No.: WO2022/241770
PCT Pub. Date: Nov. 24, 2022

(65) Prior Publication Data

US 2023/0237953 A1 Jul. 27, 2023

(51) Int. Cl.
*G09G 3/32* (2016.01)
*G09G 3/00* (2006.01)
*G09G 3/3266* (2016.01)

(52) U.S. Cl.
CPC ................ *G09G 3/32* (2013.01); *G09G 3/03* (2020.08); *G09G 3/3266* (2013.01); (Continued)

(58) Field of Classification Search
CPC ... G09G 2300/0426; G09G 2300/0819; G09G 2300/0842
See application file for complete search history.

(56) References Cited

U.S. PATENT DOCUMENTS 8,462,099 B2 6/2013 Horiuchi et al.
10,451,942 B2 10/2019 Yu et al.
(Continued)

FOREIGN PATENT DOCUMENTS

CN 101779227 A 7/2010
CN 102760718 A 10/2012
(Continued)

OTHER PUBLICATIONS

Cai Yaojun; Display Panel 2018-08-31 CN108469706A; (Year: 2018).*

*Primary Examiner* — Van N Chow
(74) *Attorney, Agent, or Firm* — Chiwin Law LLC

(57) ABSTRACT

A display substrate and a display panel are provided. The display substrate includes a base substrate; the base substrate includes a display region and a peripheral region on at least one side of the display region; the peripheral region includes a first peripheral sub-region and a second peripheral sub-region, the display region includes a first display sub-region corresponding to the first peripheral sub-region and a second display sub-region corresponding to the second peripheral sub-region, and the second display sub-region is different from the first display sub-region; the second peripheral sub-region includes a first gate driving circuit, and the first gate driving circuit is configured to be connected to a plurality of gate scanning signal lines in the first display sub-region through a plurality of connecting lines in the display region, to respectively providing a gate scanning signal to a plurality of rows of pixel units in the first display sub-region.

18 Claims, 11 Drawing Sheets

(52) U.S. Cl.
CPC ............... *G09G 2300/0842* (2013.01); *G09G 2310/0267* (2013.01); *G09G 2310/061* (2013.01)

(56) References Cited

U.S. PATENT DOCUMENTS

| | | | | |
|---|---|---|---|---|
| 10,714,505 | B2 | 7/2020 | Sogabe et al. | |
| 2016/0274404 | A1 | 9/2016 | Chen | |
| 2018/0240856 | A1 | 8/2018 | Kim et al. | |
| 2021/0082339 | A1* | 3/2021 | Zhang | G09G 3/32 |
| 2021/0118368 | A1* | 4/2021 | In | G09G 3/3275 |
| 2021/0118389 | A1* | 4/2021 | Zhang | G09G 3/3266 |
| 2023/0060545 | A1* | 3/2023 | Du | H10K 59/00 |
| 2023/0080809 | A1* | 3/2023 | Ono | G09G 3/3291 345/55 |

FOREIGN PATENT DOCUMENTS

| | | | |
|---|---|---|---|
| CN | 103499895 | A | 1/2014 |
| CN | 104793785 | A | 7/2015 |
| CN | 105278765 | A | 1/2016 |
| CN | 107039008 | A | 8/2017 |
| CN | 108461522 | A | 8/2018 |
| CN | 108469706 | A | 8/2018 |

* cited by examiner

DISPLAY SUBSTRATE AND DISPLAY DEVICE

This application is a U.S. National Phase Entry of International Application No. PCT/CN2021/095233 filed on May 21, 2021, designating the United States of America. The present application claims priority to and the benefit of the above-identified applications and the above-identified applications are incorporated by reference herein in their entirety.

TECHNICAL FIELD

The embodiment of the present disclosure relates to a display substrate and a display device.

BACKGROUND

With the continuous improvement of consumers' sensory demand for display screens and the continuous progress of manufacturing technology in the display panel industry, curved screen and curved display have become one of the most popular technologies in the display industry. For example, forming curved surface on surrounding edge of display device, such as a mobile phone, a tablet computer, etc., can visually increase the display range of the display device, for example, a full-screen display effect can be achieved, and the user's sensory experience can be improved.

SUMMARY

At least one embodiment of that present disclosure provide a display substrate, which comprises a base substrate, wherein the base substrate comprises a display region and a peripheral region on at least one side of the display region; the display region comprises a plurality of rows and a plurality of columns of pixel units arranged in an array, a plurality of gate scanning signal lines respectively connected to the plurality of rows of pixel units, and a plurality of connecting lines in different layers from the plurality of gate scanning signal lines; the peripheral region comprises a first peripheral sub-region and a second peripheral sub-region, the display region comprises a first display sub-region corresponding to the first peripheral sub-region and a second display sub-region corresponding to the second peripheral sub-region, and the second display sub-region is different from the first display sub-region; the second peripheral sub-region comprises a first gate driving circuit, and the first gate driving circuit is configured to be connected to a plurality of gate scanning signal lines in the first display sub-region through the plurality of connecting lines in the display region, to respectively providing a gate scanning signal to a plurality of rows of pixel units in the first display sub-region; and the first peripheral sub-region does not comprise the first gate driving circuit.

For example, in the display substrate provided by at least one embodiment of the present disclosure, the second peripheral sub-region further comprises a second gate driving circuit, and the second gate driving circuit is configured to be connected to a plurality of gate scanning signal lines in the second display sub-region, to respectively providing the gate scanning signal to a plurality of rows of pixel units in the second display sub-region; and the first peripheral sub-region does not comprise the second gate driving circuit.

For example, in the display substrate provided by at least one embodiment of the present disclosure, each of the plurality of connecting lines comprises a first line extending in a first direction and a second line extending in a second direction, the first direction intersects the second direction; and the first gate driving circuit is connected to the first line through the second line, and the first line is connected to a corresponding gate scanning signal line in the first display sub-region through a via hole passing through an insulating layer, to providing the gate scanning signal to the corresponding gate scanning signal line.

For example, in the display substrate provided by at least one embodiment of the present disclosure, in a case where the second line overlaps with a first line of other connecting lines, and the second line comprises at least one transfer electrode and a plurality of connecting electrodes; the plurality of connecting electrodes and the first line are in a same layer, and the at least one transfer electrode and the plurality of connecting electrodes are in different layers; the at least one transfer electrode and the first line of the other connecting lines at least partially overlap in a direction perpendicular to the base substrate; and the plurality of connecting electrodes are connected to the at least one transfer electrode through a via hole passing through an insulating layer to form the second line.

For example, in the display substrate provided by at least one embodiment of the present disclosure, an orthographic projection of the first line on the base substrate is between orthographic projections of two adjacent columns of sub-pixels in the display region on the base substrate.

For example, in the display substrate provided by at least one embodiment of the present disclosure, an orthographic projection of the second line on the base substrate is between orthographic projections of two adjacent rows of sub-pixels in the display region on the base substrate.

For example, in the display substrate provided by at least one embodiment of the present disclosure, the display region further comprises a plurality of first voltage lines, and the plurality of first voltage lines are respectively connected to the plurality of columns of pixel units and extend along the first direction, so as to respectively provide a first voltage to the plurality of columns of pixel units; and an orthographic projection of the first line on the base substrate and an orthographic projection of a first voltage line, which corresponds to the first line, on the base substrate at least partially overlap.

For example, in the display substrate provided by at least one embodiment of the present disclosure, the display region further comprises a plurality of initial signal lines, and the plurality of initial signal lines are respectively connected to the plurality of rows of pixel units and extend along the second direction, so as to respectively provide an initial voltage to the plurality of rows of pixel units; and an orthographic projection of the second line on the base substrate and an orthographic projection of an initial signal line, which corresponds to the second line, on the base substrate at least partially overlap.

For example, in the display substrate provided by at least one embodiment of the present disclosure, each of the plurality of rows and the plurality of columns of pixel units comprises a light-emitting element and a pixel circuit driving the light-emitting element to emit light, and the pixel circuit comprises a driving sub-circuit, a data writing sub-circuit, a threshold compensation sub-circuit and a reset sub-circuit; the driving sub-circuit comprises a control terminal, a first terminal and a second terminal, and the driving sub-circuit is configured to control a driving current flowing through the light-emitting element; the data writing sub-circuit is connected to the first terminal of the driving sub-circuit, a data line and the gate scanning signal line, and the data writing sub-circuit is configured to write a data signal provided by the data line into the first terminal of the driving sub-circuit in response to the gate scanning signal provided by the gate scanning signal line; the threshold compensation sub-circuit is connected to the control terminal and the second terminal of the driving sub-circuit, the first voltage line and the gate scanning signal line, and the threshold compensation sub-circuit is configured to compensate the driving sub-circuit in response to the gate scanning signal provided by the gate scanning signal line and a written data signal; and the reset sub-circuit is connected to the second terminal of the driving sub-circuit, the initial signal line and a reset signal line, and the reset sub-circuit is configured to applying the initial voltage provided by the initial signal line to the second terminal of the driving sub-circuit in response to a reset signal provided by the reset signal line.

For example, the display substrate provided by at least one embodiment of the present disclosure further comprises a semiconductor layer, a first conductive layer, a second conductive layer and a third conductive layer that are sequentially stacked in a direction perpendicular to the base substrate; the pixel circuit comprises a thin film transistor and a storage capacitor; the thin film transistor comprises a gate electrode, a source electrode, a drain electrode and a source and drain region corresponding to the source electrode and the drain electrode, and the storage capacitor comprises a first capacitor electrode and a second capacitor electrode opposite to the first capacitor electrode in a direction perpendicular to a board surface of the base substrate; the semiconductor layer comprises the source and drain region; the first conductive layer comprises the gate electrode of the thin film transistor, the first capacitor electrode of the storage capacitor and the gate scanning signal line, the second conductive layer comprises the initial signal line and the second capacitor electrode of the storage capacitor; and the third conductive layer comprises the first voltage line, the source electrode and the drain electrode.

For example, the display substrate provided by at least one embodiment of the present disclosure further comprises a fourth conductive layer, wherein the fourth conductive layer comprises the at least one transfer electrode.

For example, the display substrate provided by at least one embodiment of the present disclosure further comprises a fifth conductive layer, wherein, the fifth conductive layer comprises the first line and the second line.

For example, in the display substrate provided by at least one embodiment of the present disclosure, the plurality of rows of pixel units in the first display sub-region are arranged in a stepped shape in the first direction.

For example, in the display substrate provided by at least one embodiment of the present disclosure, a number of pixel units in each row in the first display sub-region is less than or equal to a number of pixel units in each row in the second display sub-region.

At least one embodiment of the present disclosure provide a display device, which comprises the display substrate described in any of the above embodiments.

For example, in the display device provided by at least one embodiment of the present disclosure, the peripheral region of the display substrate further comprises a third peripheral sub-region, the first peripheral sub-region is between the second peripheral sub-region and the third peripheral sub-region; the second peripheral sub-region comprises a first straight edge portion extending in a first direction, the third peripheral sub-region comprises a second straight edge portion extending in a second direction, and the first peripheral sub-region comprises a corner edge portion connecting the first straight edge portion and the second straight edge portion; and the first direction intersects the second direction.

For example, in the display device provided by at least one embodiment of the present disclosure, the display substrate comprises a display side and a non-display side; and the first straight edge portion and the second straight edge portion are configured to be bendable in a direction toward the non-display side.

For example, in the display device provided by at least one embodiment of the present disclosure, the corner edge portion comprises an arcuate edge portion.

For example, in the display device provided by at least one embodiment of the present disclosure, the display substrate comprises a display side and a non-display side, and the corner edge portion is configured to be bendable in a direction toward the non-display side.

BRIEF DESCRIPTION OF THE DRAWINGS

In order to clearly illustrate the technical solutions of the embodiments of the present disclosure, the drawings of the embodiments will be briefly described in the following; it is obvious that the described drawings are only related to some embodiments of the present disclosure and thus are not limitative to the present disclosure.

DETAILED DESCRIPTION

In order to make objects, technical solutions, and advantages of the embodiments of the present disclosure apparent, the technical solutions of the embodiments of the present disclosure will be described in a clearly and fully understandable way in connection with the drawings related to the embodiments of the present disclosure. Apparently, the described embodiments are just a part but not all of the embodiments of the present disclosure. Based on the described embodiments of the present disclosure, those skilled in the art can obtain other embodiment(s), without any inventive work, which should be within the scope of the present disclosure.

Unless otherwise defined, all the technical and scientific terms used herein have the same meanings as commonly understood by one of ordinary skill in the art to which the present disclosure belongs. The terms “first,” “second,” etc., which are used in the present disclosure, are not intended to indicate any sequence, amount or importance, but distinguish various components. The terms “comprise,” “comprising,” “include,” “including,” etc., are intended to specify that the elements or the objects stated before these terms encompass the elements or the objects and equivalents thereof listed after these terms, but do not preclude the other elements or objects. The phrases “connect”, “connected”, etc., are not intended to define a physical connection or mechanical connection, but may include an electrical connection, directly or indirectly. “On,” “under,” “right,” “left” and the like are only used to indicate relative position relationship, and when the position of the object which is described is changed, the relative position relationship may be changed accordingly.

In order to keep the following description of the embodiments of the present disclosure clear and concise, the detailed description of some known functions and known components is omitted in the present disclosure.

Figure 1A:
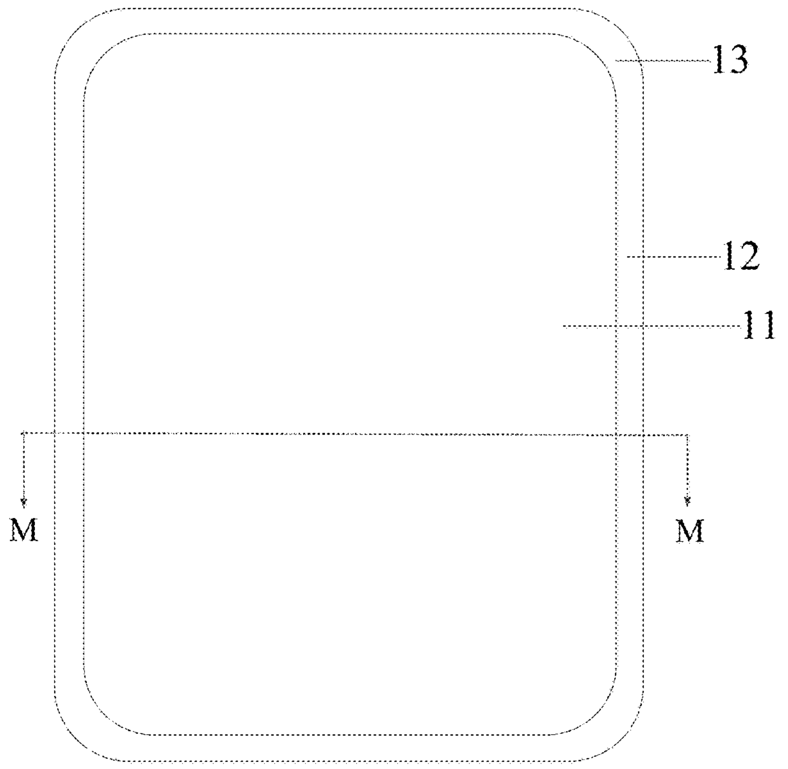
FIG. 1A shows a schematic plan view of a display substrate.

FIG. 1A shows a schematic plan view of a display substrate, as shown in FIG. 1A, the display substrate includes a display region 11 and a peripheral region 12 surrounding the display region 11. The display region 11 includes a plurality of sub-pixels arranged in an array for display. The peripheral region 12 includes structures, such as a driving circuit that drives the plurality of sub-pixels in the display region 11 to display, etc.

Figure 1B:
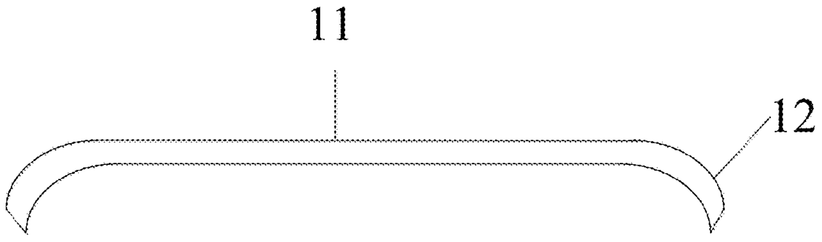
FIG. 1B shows a schematic cross-sectional view of the display substrate in FIG. 1A along a line M-M.

For example, FIG. 1B shows a schematic cross-sectional view of the display substrate in FIG. 1A along the line M-M. As shown in FIG. 1B, the display substrate can realize a curved display of a periphery of the display region 11 by bending the peripheral region 12 to a non-display side (a side away from a paper in FIG. 1A, that is, a lower side in FIG. 1B) of the display substrate. For example, in the case where the peripheral region 12 is bent, a corner portion 13 of the peripheral region 12 is likely to generate comparatively large stress, and defects, such as wrinkles, etc., are likely to occur in the corner portion 13, which greatly affects the product yield.

In order to reduce the wrinkle problem in the case where the periphery region of the display substrate is bent, a larger corner angle may be set at the corner portion 13, and a frame width of the corner portion may be reduced. A large corner and a narrow frame width at the corner portion can reduce the stress concentration in the case where four sides of the display panel are bent, which improves the yield of four-sided curved products. However, because the peripheral region usually needs to be provided with a display driving circuit, and a certain packaging area needs to be reserved in the peripheral region, it is difficult to realize the design of a narrow frame at the corner portion. For example, for an OLED (an Organic Light-Emitting Display) display panel, due to the limitation of its organic film layer's characteristics of easy water absorption, it is necessary to ensure a certain packaging area in the corner portion, for example, the packaging area is 300~400 μm (micron), and in the case that the frame width of the OLED display panel is 400~600 μm, the corner portion 13 does not have enough space for placing the display driving circuit, which increases the difficulty for the realization of the narrow frame of four-sided curved products, and is not conducive to the improvement of the yield rate of four-sided curved products.

At least one embodiment of the present disclosure provides a display substrate and a display device, the display substrate includes a base substrate, the base substrate includes a display region and a peripheral region on at least one side of the display region, the display region includes a plurality of rows and a plurality of columns of pixel units arranged in an array, a plurality of gate scanning signal lines respectively connected to the plurality of rows of pixel units, and a plurality of connecting lines disposed in different layers from the plurality of gate scanning signal lines; the peripheral region includes a first peripheral sub-region and a second peripheral sub-region, the display region includes a first display sub-region corresponding to the first peripheral sub-region and a second display sub-region corresponding to the second peripheral sub-region, and the second display sub-region is different from the first display sub-region; the second peripheral sub-region includes a first gate driving circuit, and the first gate driving circuit is configured to be connected to a plurality of gate scanning signal lines in the first display sub-region through the plurality of connecting lines in the display region, to respectively providing a gate scanning signal to a plurality of rows of pixel units in the first display sub-region; the first peripheral sub-region does not include the first gate driving circuit.

In the display substrate provided by the embodiment of the present disclosure, the first gate driving circuit that provides the gate scanning signal for the first display sub-region is disposed in the second peripheral sub-region corresponding to the second display sub-region, instead of being disposed in the first peripheral sub-region corresponding to the first display sub-region. In this way, it can be avoided that the first gate driving circuit (and its connecting lines) are arranged in the first peripheral sub-region, the width of the first peripheral sub-region without the first gate driving circuit is narrower than that of the first peripheral sub-region provided with the first gate driving circuit, which is easy to realize a narrow frame, thereby reducing stress concentration during large-angle bending, improving wrinkles and other defects, and improving product yield.

For example, the first display sub-region and the first peripheral sub-region may both correspond to corner portion of the display substrate, and the second display sub-region and the second peripheral sub-region both correspond to non-corner portion of the display substrate. In the embodiment of the present disclosure, the gate driving circuit for driving pixel units in the display sub-region corresponding to the corner portion is disposed in the peripheral sub-region corresponding to the non-corner portion, and the gate driving circuit corresponding to the non-corner portion is connected to the pixel units in the display sub-region corresponding to the corner portion through the lines in the display region, so as to realize scanning driving of the pixel units in the display sub-region corresponding to the corner portion. Because the gate driving circuit (and its connecting lines) is not provided in the peripheral sub-region corresponding to the corner portion, the width of the peripheral sub-region corresponding to the corner portion can be reduced to realize a narrow frame of the corner portion, thereby reducing stress concentration during large-angle bending, improving wrinkles and other defects, and improving product yield.

Several embodiments of the present disclosure will be described in detail below with reference to the accompanying drawings, but the present disclosure is not limited to these specific embodiments.

Figure 2:
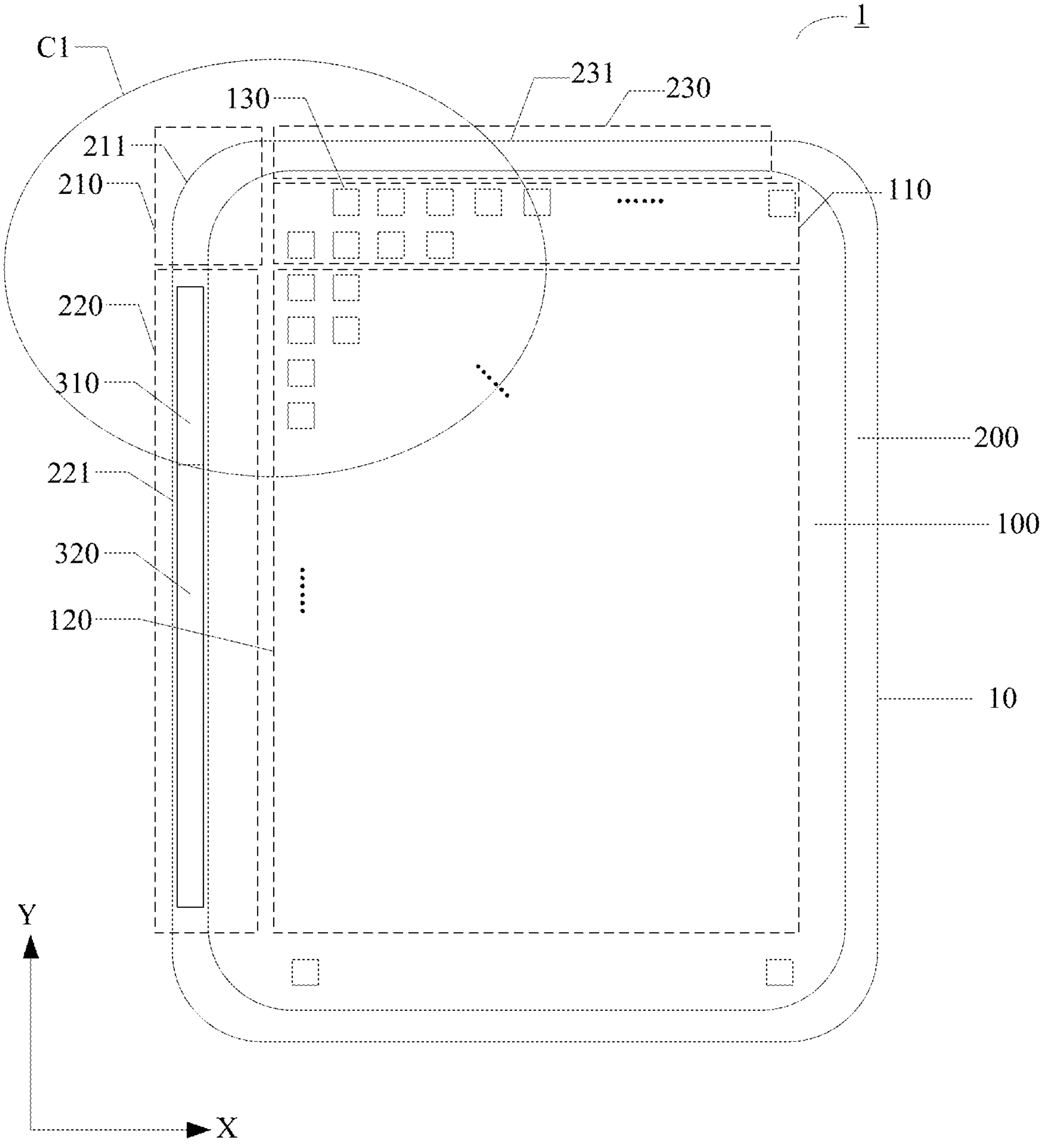
FIG. 2 is a schematic plan view of a display substrate provided by some embodiments of the present disclosure.

FIG. 2 is a schematic plan view of a display substrate provided by some embodiments of the present disclosure. As shown in FIG. 2, the display substrate 1 includes a base substrate 10, and the base substrate 10 includes a display region 100 and a peripheral region 200 on at least one side of the display region 100. For example, the display region 100 includes a plurality of rows and a plurality of columns of pixel units 130 arranged in an array, a plurality of gate scanning signal lines (not shown in FIG. 2) respectively connected to the plurality of rows of pixel units 130, and a plurality of connecting lines (not shown in FIG. 2) disposed in different layers from the plurality of gate scanning signal lines. The peripheral region 200 includes a first peripheral sub-region 210 and a second peripheral sub-region 220, the display region 100 includes a first display sub-region 110 corresponding to the first peripheral sub-region 210 and a second display sub-region 120 corresponding to the second peripheral sub-region 220.

For example, as shown in FIG. 2, the peripheral region 200 of the display substrate further includes a third peripheral sub-region 230. The first peripheral sub-region 210 is located between the second peripheral sub-region 220 and the third peripheral sub-region 230. The second peripheral sub-region 220 includes a first straight edge portion 221 extending along a first direction Y, the third peripheral sub-region 230 includes a second straight edge portion 231 extending along a second direction X, and the first peripheral sub-region 210 includes a corner edge portion 211 connecting the first straight edge portion 221 and the second straight edge portion 231, the first direction Y intersects the second direction X. For example, the corner edge portion 211 includes an arcuate edge portion.

For example, the display substrate includes a display side and a non-display side, and the first straight edge portion and the second straight edge portion are configured to be bendable in a direction toward the non-display side. The corner edge portion is configured to be bendable in the direction toward the non-display side.

For example, the second peripheral sub-region 220 includes a first gate driving circuit 310, and the first gate driving circuit 310 is configured to be connected to a plurality of gate scanning signal lines in the first display sub-region 110 through the plurality of connecting lines in the display region 100, to respectively providing gate scanning signals to a plurality of rows of pixel units 130 in the first display sub-region 110.

Figure 3:
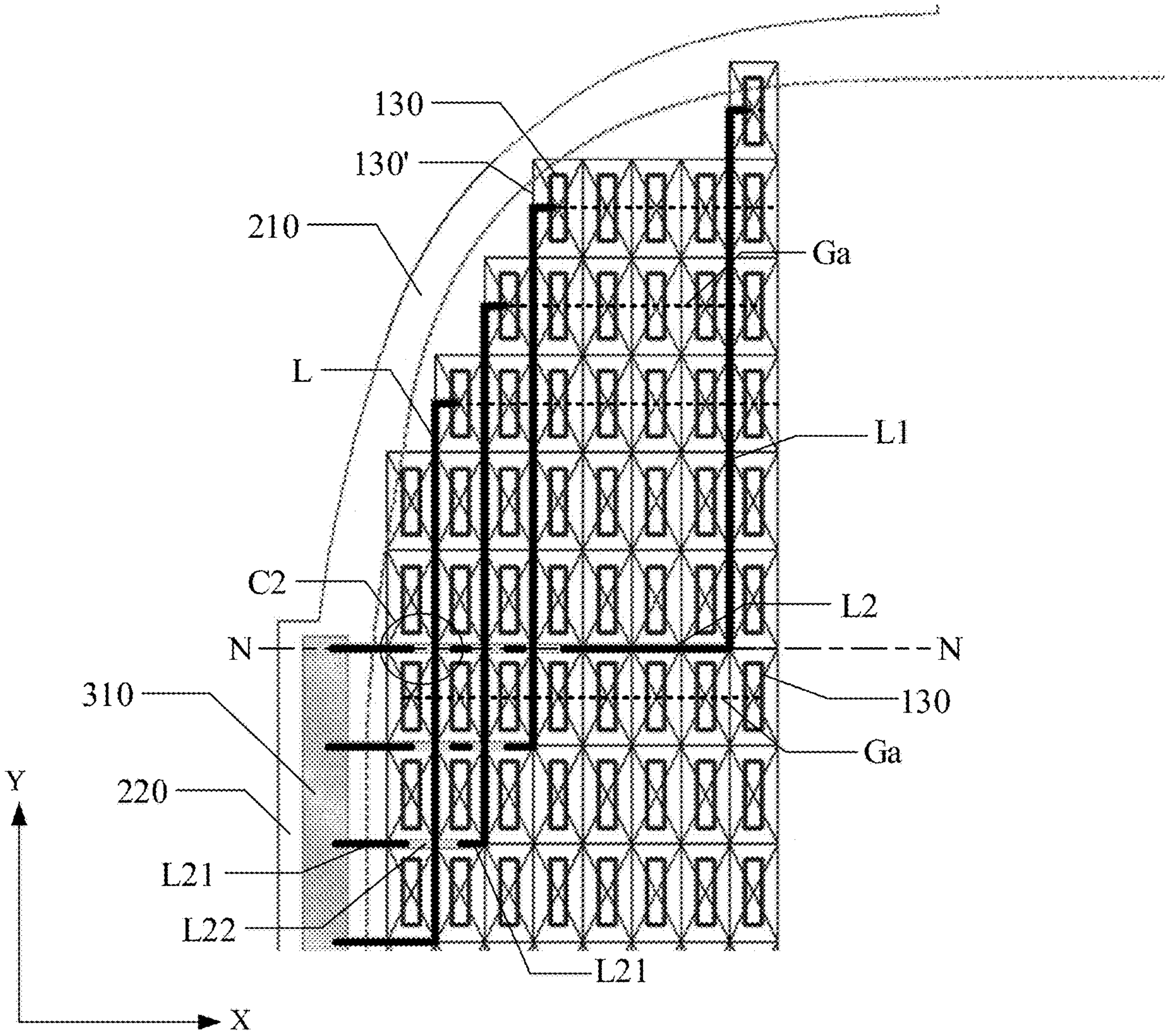
FIG. 3 is a schematic diagram of a corner region of a display substrate provided by some embodiments of the present disclosure.

FIG. 3 is an enlarged schematic diagram of a corner region of a display substrate (eg, the region corresponding to a circle C1 in FIG. 2) provided by some embodiments of the present disclosure. As shown in FIG. 2 and FIG. 3, the first peripheral sub-region 210 may be a peripheral region at a corner, for reference to the peripheral region above the dividing line N-N as shown in FIG. 3, the first peripheral sub-region 210 may be arc-shaped. The second peripheral sub-region 220 is, for example, a peripheral region corresponding to a non-corner, such as a straight edge region close to the first peripheral sub-region 210, can refer to the peripheral region below the dividing line N-N as shown in FIG. 3. The second peripheral sub-region 220 and the first peripheral sub-region 210 may be arranged along the first direction Y For example, if the first peripheral sub-region 210 is an upper left corner region of the display substrate, the second peripheral sub-region 220 may be a left side region located below the upper left corner region. If the first peripheral sub-region 210 is the lower left corner region of the display substrate, the second peripheral sub-region 220 may be the left side region located above the lower left corner region. The peripheral region on the right side is similar to this case, which is not limited by the embodiments of the present disclosure.

For example, the first display sub-region 110 may refer to the display sub-region above the dividing line N-N as shown in FIG. 3. The first display sub-region 110 corresponds to the first peripheral sub-region 210, for example, the first display sub-region 110 is arranged along the second direction X with the first peripheral sub-region 210, that is, the second display sub-region 120 is aligned laterally with the first peripheral sub-region 210. The second display sub-region 120 may refer to the display sub-region below the dividing line N-N as shown in FIG. 3. The second display sub-region 120 corresponds to the second peripheral sub-region 220, for example, the second display sub-region 120 is arranged along the second direction X with the second peripheral sub-region 220, that is, the second display sub-region 120 is aligned laterally with the second peripheral sub-region 220.

For example, the plurality of rows of pixel units in the first display sub-region is arranged in a stepped shape in the first direction. For example, in order to adapt to the arc shape of the corner, the number of pixel units included in each row in the first display sub-region 120 increases row by row from the first row. For example, m (m is an integer greater than 0) pixel units may be set in the first row, m+n (n is an integer greater than 0) pixel units may be set in the second row, m+2n pixel units may be set in the third row, and m+3n pixel units may be set in the fourth row, and so on. It should be noted that as long as the number of pixel units located in a row is greater than or equal to the number of pixel units located in a previous row, the specific number depends on the actual situation, which is not limited by the embodiments of the present disclosure.

For example, the first display sub-region 120 shown in FIG. 3 only includes four rows of pixel units, and the first display sub-region 120 may also include more or less rows of pixel units, which is not limited by the embodiment of the present disclosure.

For example, the number of pixel units in each row in the first display sub-region is less than or equal to the number of pixel units in each row in the second display sub-region. For example, the number of pixel units in respective rows of the second display sub-region are equal, and the number of pixel units in respective rows of the first display sub-region 120 increases row by row until the number of pixel units in the last row of the first display sub-region 120 is less than or equal to the number of pixel units in each row in the second display sub-region, which is not limited in the embodiment of the present disclosure.

For example, the first gate driving circuit 310 is located in the second peripheral sub-region 220, and the first gate driving circuit 310 may include a plurality of shift register units in cascade, and each shift register unit can output a gate scanning signal.

For example, the first display sub-region 110 includes a plurality of rows and a plurality of columns of pixel units 130, the pixel units 130 in each row are connected to at least one gate scanning signal line Ga, and each gate scanning signal line Ga can provide a gate scanning signal to each pixel unit 130 in the row where the gate scanning signal line Ga is located, for example, the gate scanning signal line can provide a gate scanning signal to a data writing transistor in the pixel unit. The display region includes a plurality of connecting lines L, and each connecting line L may be connected to a shift register unit and a gate scanning signal line Ga, so as to transmit the gate scanning signal output by the shift register unit to the gate scanning signal line Ga. For example, in some embodiments, the number of connecting lines L, the number of gate scanning signal lines Ga, and the number of rows of pixel units in the first display sub-region 110 may be equal, that is, the plurality of connecting lines L may be in one-to-one correspondence with the plurality of gate scanning signal lines Ga in the first display sub-region 110 and the plurality of rows of pixel units in the first display sub-region 110.

In the embodiments of the present disclosure, the first gate driving circuit that provides the gate scanning signal for the first display sub-region is disposed in the second peripheral sub-region corresponding to the second display sub-region, instead of disposed in the first peripheral sub-region corresponding to the first display sub-region. In this way, the first peripheral sub-region does not need to provide a gate driving circuit (and its connecting lines), and the peripheral sub-region without the gate driving circuit has a narrower width relative to the peripheral sub-region with the gate driving circuit, and it is easy to realize a narrow frame, which can reduce stress concentration when bending at a large angle, improve wrinkles and other defects, and improve product yield. For example, the first display sub-region and the first peripheral sub-region may both correspond to corner portion of the display substrate, and the second display sub-region and the second peripheral sub-region both correspond to non-corner portion of the display substrate. The gate driving circuit for driving pixel units in the display sub-region corresponding to the corner portion is disposed in the peripheral sub-region corresponding to the non-corner portion, and the gate driving circuit corresponding to the non-corner portion is connected to the pixel units in the display sub-region corresponding to the corner portion through the lines in the display region, so as to realize scanning driving of the pixel units in the display sub-region corresponding to the corner portion. Because the gate driving circuit (and its connecting lines) is not provided in the peripheral sub-region corresponding to the corner portion, the width of the peripheral sub-region corresponding to the corner portion can be reduced to realize a narrow frame of the corner portion, thereby reducing stress concentration during large-angle bending, improving wrinkles and other defects, and improving product yield.

For example, as shown in FIG. 2, the second peripheral sub-region 220 further includes a second gate driving circuit 320, and the second gate driving circuit 320 is configured to be connected to a plurality of gate scanning signal lines in the second display sub-region 120, so as to respectively provide gate scanning signals to the pixel units in the rows of the second display sub-region 120.

For example, the second display sub-region 120 may also include a plurality of rows and a plurality of columns of pixel units 130, the pixel units 130 in each row are connected to at least one gate scanning signal line Ga, and each gate scanning signal line Ga can provide a gate scanning signal to each pixel unit 130 in the row where the gate scanning signal line Ga is located. The second gate driving circuit 320 and the first gate driving circuit 310 may be arranged along the first direction Y, for example, the second gate driving circuit 320 is located below the first gate driving circuit 310 in FIG. 3. The second gate driving circuit 320 includes a plurality of shift register units arranged along the first direction Y, each shift register unit can output a gate driving signal, and each shift register unit may be connected to a gate scanning signal line Ga in the second display sub-region 120. For example, in some embodiments, the input signal of a first stage of shift register unit of the second gate driving circuit 320 is the output signal of a last first stage of shift register unit of the first gate driving circuit 310, so that it can be realized that starting from a first stage of shift register unit of the first gate driving circuit 310, the gate scanning signals are output row by row to the correspondingly connected gate scanning signal lines, so as to realize the row-by-row driving of the pixel units located in the display region.

For example, the first peripheral sub-region does not include the first gate driving circuit or the second gate driving circuit. For example, the first peripheral sub-region is not provided with any gate driving circuit, and the gate driving circuits are all provided in the peripheral sub-region corresponding to the straight edge of the display substrate, thereby reducing the width of the first peripheral sub-region.

For example, as shown in FIG. 3, each of the plurality of connecting lines includes a first line extending in the first direction Y and a second line extending in the second direction X, and the first direction Y intersects the second direction X. The first gate driving circuit 310 is connected to the first line through the second line, the first line is connected to a corresponding gate scanning signal line in the first display sub-region 120 through a via hole passing through an insulating layer, to providing the gate scanning signal to the corresponding gate scanning signal line.

For example, each connecting line L may be in an inverted "L" shape, each connecting line L including a vertical first line L1 and a lateral second line L2. An end of the horizontal second line L2 is connected to the first gate driving circuit 310, and the other end is connected to the vertical first line L1. An end of the first line L1 is connected to the second line L2, and the other end is connected to a corresponding gate scanning signal line. In a direction perpendicular to the base substrate, the connecting line L and the gate scanning signal line Ga may be disposed in different layers. For example, the gate scanning signal line Ga may be disposed in a first conductive layer (as shown in FIG. 7C below), and the connecting line L may be disposed in a fourth conductive layer (as shown in FIG. 7F below). Insulating layers are provided between the first conductive layer and the fourth conductive layer, and a via hole may be provided on the insulating layers at a position overlapping with the gate scanning signal line Ga and the connecting line L, and the gate scanning signal line Ga and the connecting line L can be connected through the via hole.

For example, as shown in FIG. 3, in the case where a second line L2 of a connecting line overlaps with a first line L1 of other connecting lines, the second line L2 includes at least one transfer electrode L22 and a plurality of connecting electrodes L21, the plurality of connecting electrodes L21 and the first line L1 are disposed in a same layer, and the at least one transfer electrode L22 and the plurality of connecting electrodes L21 are disposed in different layers. The at least one transfer electrode L22 and the first line L1 of the other connecting lines at least partially overlap in the direction perpendicular to the base substrate, the plurality of connecting electrodes L21 are connected to the at least one transfer electrode L22 through a via hole passing through an insulating layer to form the second line L2.

Figure 4:
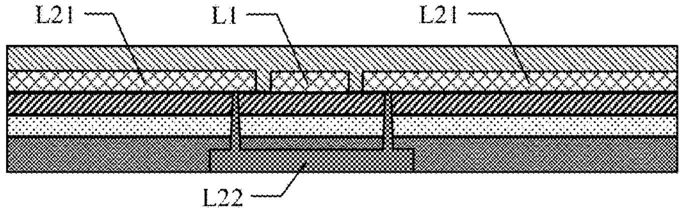
FIG. 4 is a schematic cross-sectional view of a transfer electrode and a connecting electrode provided by some embodiments of the present disclosure.

FIG. 4 is a schematic cross-sectional view of a transfer electrode and a connecting electrode provided by some embodiments of the present disclosure (for example, the cross-section of the circled region C2 in FIG. 3 along the dividing line N-N). As shown in FIG. 3 and FIG. 4, the second line L2 on the dividing line N-N overlaps with at least three vertical first lines L1. Because the first lines L1 and the second line L2 are disposed in a same layer, if the first lines L1 and the second line L2 cross, the signal transmission will be affected. In order to avoid the influence on signal transmission, the second line L2 may be divided into a plurality of connecting electrodes L21, the first lines L1 may pass through the gap between the connecting electrodes L21, and every two adjacent connecting electrodes L21 are connected via a transfer electrode L22 in a different layer. For example, the connecting electrode L21 and the first line L1 may be disposed in the fourth conductive layer, and the transfer electrode L22 may be disposed in the first conductive layer or the second conductive layer (as shown in FIG. 7D below) or the third conductive layer (as shown in the following figure) 7E). Insulating layers may be disposed between the fourth conductive layer and the first conductive layer, or between the fourth conductive layer and the second conductive layer, or between the fourth conductive layer and the third conductive layer. A via hole is provided on the insulating layers, and the transfer electrode L22 is connected to the connecting electrode L21 through the via hole of the insulating layers.

For example, an orthographic projection of the first line on the base substrate is between orthographic projections of two adjacent columns of pixel units in the display region on the base substrate.

For example, an orthographic projection of the second line on the base substrate is between orthographic projections of two adjacent rows of pixel units the display region on the base substrate.

For example, as shown in FIG. 3, the size of the pixel unit may be reduced from the original pixel unit 130' to the pixel unit 130 with a smaller occupied area. For example, the pixel unit 130' may be reduced as a whole, that is, the occupied area of each transistor in the pixel unit and the spacing between transistors may be reduced. The outline of the reduced pixel unit 130 may be reduced, for example, by 4-18 μm relative to the outline of the original pixel unit 130'. After the pixel units are reduced, the gaps between adjacent pixel units 130 become larger, so the connecting lines L can be arranged between the pixel units 130. For example, in the direction perpendicular to the base substrate, the horizontal second line may be disposed between two adjacent rows of pixel units, and the vertical first line may be disposed between two adjacent columns of pixel units.

In another embodiment of the present disclosure, the vertical size of the pixel unit may be kept unchanged, and the horizontal size of the pixel unit may be reduced, so as to increase the distance between the pixel units in two adjacent columns, so that the vertical first line can be arranged between two adjacent columns of pixel units.

In another embodiment of the present disclosure, the horizontal size of the pixel unit may be kept unchanged, and the vertical size of the pixel unit may be reduced, so as to increase the distance between the pixel units in two adjacent rows, so that the horizontal second line can be arranged between two adjacent rows of pixel units.

In the embodiment of the present disclosure, by arranging the first line and/or the second line between two adjacent columns of pixel units and/or two adjacent rows of pixel units, the layout structure of each pixel unit does not need to be changed, and the influence of the variation of the gate scanning signal in the connecting lines on the circuit of the pixel unit can be avoided.

Figure 5:
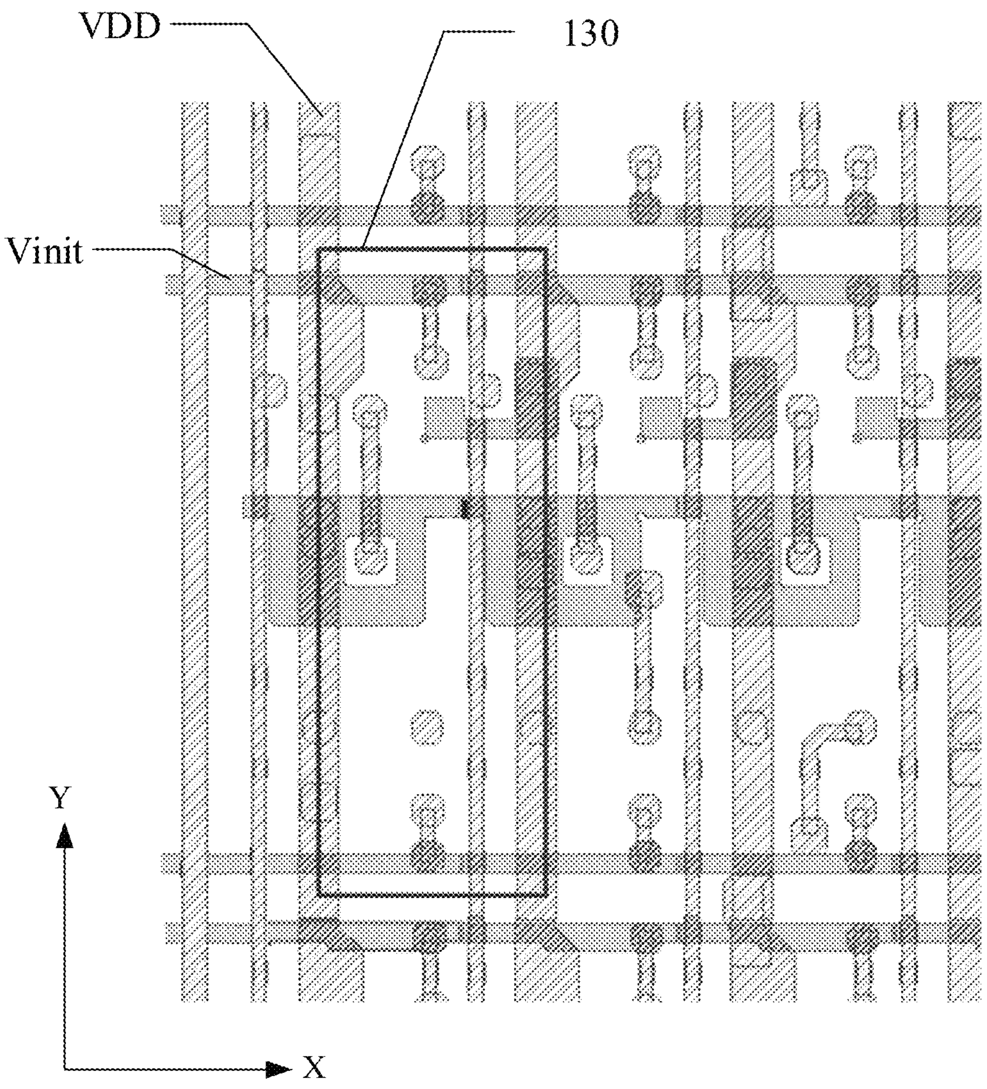
FIG. 5 is a schematic diagram of a partial layout of a display region provided by some embodiments of the present disclosure.

FIG. 5 is a schematic diagram of a partial layout of a display region provided by some embodiments of the present disclosure. As shown in FIG. 5, the display region further includes a plurality of first voltage lines VDD, the plurality of first voltage lines VDD are respectively connected to the plurality of columns of pixel units 130 and extend along the first direction Y, so as to respectively provide first voltages to the plurality of columns of pixel units 130. The orthographic projection of the first line on the base substrate and an orthographic projection of the corresponding first voltage line VDD on the base substrate at least partially overlap.

For example, each column of pixel units may be connected to at least one first voltage line VDD, the first voltage line VDD may extend along the first direction Y and be connected to each pixel unit 130 in a corresponding column to provide the first voltage for each pixel unit 130 in the column. Each first line may not be disposed in the gap between the pixel units, but overlap with a column of pixel units 130 in the direction perpendicular to the base substrate, and at least partially overlap with the first voltage line VDD connected to the column of pixel units 130. Because the DC signal is transmitted in the first voltage line VDD, making the first line and the first voltage line VDD at least partially overlap in the direction perpendicular to the base substrate can shield the influence of the variation of the gate scanning signal in the first line on the pixel circuit in the pixel unit.

For example, the display region further includes a plurality of initial signal lines Vinit, which are respectively connected to the plurality of rows of pixel units 130 and extend along the second direction X, so as to respectively provide initial voltages to the plurality of rows of pixel units 130. The orthographic projection of the second line on the base substrate and an orthographic projection of corresponding initial signal line on the base substrate at least partially overlap.

For example, each row of pixel units 130 may be connected to at least one initial signal line Vinit, the initial signal line Vinit may extend along the second direction X and be connected with each pixel unit 130 in a corresponding row to provide each pixel unit in the row with an initial voltage. The second line may not be disposed in the gaps between the pixel units, but overlap with a row of pixel units in the direction perpendicular to the base substrate, and at least partially overlap with the initial signal line Vinit connected to a row of pixel units. Because the DC signal is transmitted in the initial signal line Vinit, enabling the second line and the initial signal line Vinit to be at least partially overlap in the direction perpendicular to the base substrate can shield the influence of the variation of the gate scanning signal in the second line on the pixel circuit.

In the embodiment of the present disclosure, by enabling the first line and the first voltage line VDD to be at least partially overlap in the direction perpendicular to the base substrate, and/or enabling the second line and the initial signal line Vinit to be at least partially overlap in the direction perpendicular to the base substrate, on the one hand, the occupied area of the pixel unit does not need to be reduced, so as to meet the requirement of high resolution, and on the other hand, the influence of the connecting line on the pixel circuit can be shielded, thereby improving the stability of the display substrate.

Figure 6:
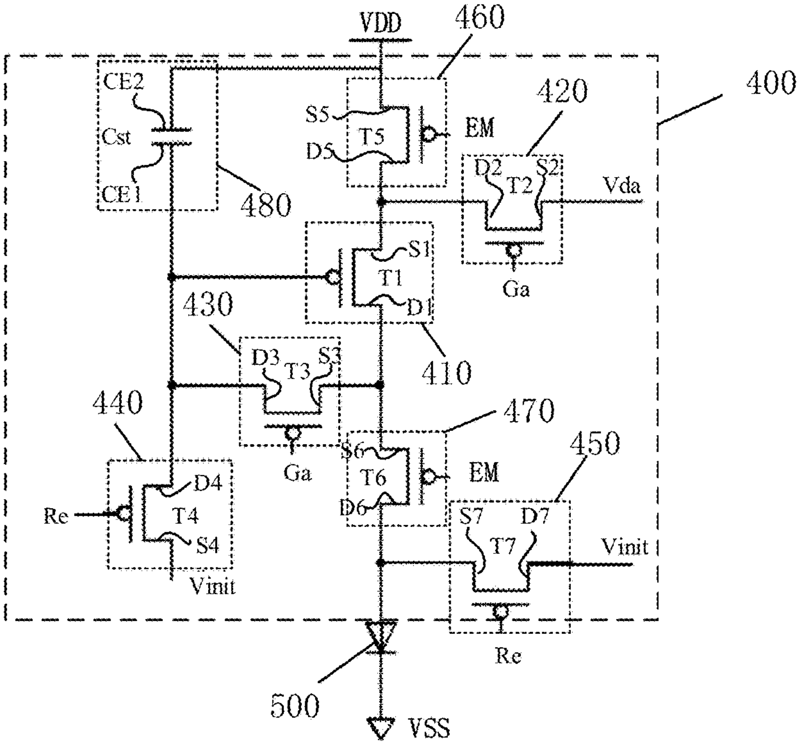
FIG. 6 is an equivalent circuit diagram of a pixel circuit in a display substrate provided by some embodiments of the present disclosure.

For example, each pixel unit of the plurality of rows and the plurality of columns of pixel units includes a light-emitting element and a pixel circuit that drives the light-emitting element to emit light. FIG. 6 is an equivalent circuit diagram of a pixel circuit in a display substrate provided by some embodiments of the present disclosure. As shown in FIG. 6, the pixel circuit 400 includes a driving sub-circuit 410, a data writing sub-circuit 420, a threshold compensation sub-circuit 430 and a reset subcircuit.

The driving sub-circuit 410 includes a control terminal, a first terminal and a second terminal, and is configured to control a driving current flowing through the light-emitting element. The data writing sub-circuit 420 is connected to the first terminal of the driving sub-circuit 410, a data line and the gate scanning signal line Ga, and is configured to write a data signal provided by the data line Vda into the first terminal of the driving sub-circuit 410 in response to the gate scanning signal provided by the gate scanning signal line Ga.

The threshold compensation sub-circuit 430 is connected to the control terminal and the second terminal of the driving sub-circuit 410, the first voltage line VDD and the gate scanning signal line Ga, and is configured to compensating the driving sub-circuit 410 in response to the gate scanning signal provided by the gate scanning signal line Ga and a written data signal.

The reset sub-circuit is connected to the second terminal of the driving sub-circuit 410, the initial signal line Vinit and a reset signal line Re, and is configured to applying the initial voltage provided by the initial signal line Vinit to the second terminal of the driving sub-circuit 410 in response to a reset signal provided by the reset signal line Re.

The reset sub-circuit may include a first reset sub-circuit 440 and a second reset sub-circuit 450. The first reset sub-circuit 440 is connected to the second terminal of the driving sub-circuit 410, the initial signal line Vinit and the reset signal line Re, and is configured to applying the initial voltage provided by the initial signal line Vinit to the second terminal of the driving sub-circuit 410 in response to a reset signal provided by the reset signal line Re. The second reset sub-circuit 450 is connected to the initial signal line Vinit, the reset signal line Re and a first terminal of the light-emitting element 500, and is configured to apply the initial voltage provided by the initial signal line Vinit to the first terminal of the light-emitting element 500 in response to the reset signal provided by the reset signal line Re.

For example, the pixel circuit 400 further includes a first light-emitting control sub-circuit 460 and a second light-emitting control sub-circuit 470. The first light-emitting control sub-circuit 460 is connected to the first voltage line VDD, the first terminal of the driving sub-circuit 410 and a light-emitting control signal line EM, and is configured to apply the first voltage provided by the first voltage line VDD to the first terminal of the driving sub-circuit 410 in response to the light-emitting control signal provided by the light-emitting control signal line EM. The second light-emitting control sub-circuit 470 is connected to the second terminal of the driving sub-circuit 410, the first terminal of the light-emitting element 500 and the light-emitting control signal line EM, and is configured to apply a drive current to the first terminal of the light-emitting element in response to the light-emitting control signal provided by the light-emitting control signal line EM.

For example, the pixel circuit 400 further includes a storage sub-circuit 480, which is connected to the control terminal of the driving sub-circuit 410 and the first voltage line VDD, and is configured to store the compensation signal and keep the compensation signal at the control terminal of the driving sub-circuit 410.

For example, the pixel circuit includes a thin film transistor and a storage capacitor. The thin film transistor includes an active layer, a gate electrode, a source electrode and a drain electrode, the storage capacitor includes a first capacitor electrode and a second capacitor electrode opposite to the first capacitor electrode in a direction perpendicular to a board surface of the base substrate. The source electrode and the drain electrode are disposed on a side of the active layer away from the base substrate, and the gate scanning signal line is disposed in a same layer as the gate electrode of the thin film transistor and the first capacitor electrode. The initial signal line and the second capacitor electrode are disposed in a same layer. The first voltage line, the source electrode and the drain electrode are disposed in a same layer.

For example, as shown in FIG. 6, in some embodiments, the driving sub-circuit 410 includes a driving transistor T1, the data writing sub-circuit 420 includes a data writing transistor T2, the threshold compensation sub-circuit 430 includes a threshold compensation transistor T3, the first reset sub-circuit 440 includes a first reset transistor T4, the second reset sub-circuit 450 includes a second reset transistor T7, the first light-emitting control sub-circuit 460 includes a first light-emitting control transistor T5, the second light-emitting control sub-circuit 470 includes a second light-emitting control transistor T6, and the storage sub-circuit 480 includes a storage capacitor Cst. For example, in this example, the pixel circuit 400 may be a 7T1C pixel driving circuit.

For example, as shown in FIG. 6, a first gate electrode of the driving transistor T1 is electrically connected to a third drain electrode D3 of the threshold compensation transistor T3 and a fourth drain electrode D4 of the first reset transistor T4. A first source electrode S1 of the driving transistor T1 is electrically connected to a second drain electrode D2 of the data writing transistor T2 and a fifth drain electrode D5 of the first light-emitting control transistor T5. A first drain electrode D1 of the driving transistor T1 is electrically connected to a third source electrode S3 of the threshold compensation transistor T3 and a sixth source electrode S6 of the second light-emitting control transistor T6.

For example, as shown in FIG. 6, a second gate electrode of the data writing transistor T2 is configured to be electrically connected to the gate scanning signal line Ga to receive the gate scanning signal, and a second source electrode S2 of the data writing transistor T2 is configured to be electrically connected to the data line Vda to receive the data signal, and the second drain electrode D2 of the data writing sub-circuit T2 is electrically connected to the first source electrode S1 of the driving transistor T1.

For example, as shown in FIG. 6, a third gate electrode of the threshold compensation transistor T3 is configured to be electrically connected to the gate scanning signal line Ga, the third source electrode S3 of the threshold compensation transistor T3 is electrically connected to the first drain electrode D1 of the driving transistor T1, and the third drain electrode D3 of the threshold compensation transistor T3 is electrically connected to a first gate electrode G1 of the driving transistor T1.

For example, as shown in FIG. 6, a fourth gate electrode of the first reset transistor T4 is configured to be electrically connected to the reset signal line Re to receive the reset signal, a fourth source electrode S4 of the first reset transistor T4 is configured to be electrically connected to the initial signal line Vinit to receive initial signal, and the fourth drain electrode D4 of the first reset transistor T4 is electrically connected to the first gate electrode of the driving transistor T1.

For example, as shown in FIG. 6, a fifth gate electrode of the first light-emitting control transistor T5 is configured to be electrically connected to the light-emitting control signal line EM to receive the light-emitting control signal, a fifth source electrode S5 of the first light-emitting control transistor T5 is configured to be electrically connected to the first voltage line VDD to receive a first voltage signal, and the fifth drain electrode D5 of the first light-emitting control transistor T5 is electrically connected to the first source electrode S1 of the driving transistor T1.

For example, as shown in FIG. 6, a sixth gate electrode of the second light-emitting control transistor T6 is configured to be electrically connected to the light-emitting control line EM to receive the light-emitting control signal, the sixth source electrode S6 of the second light-emitting control transistor T6 is electrically connected to the first drain electrode D1 of the driving transistor T1, and a sixth drain electrode D6 of the second light-emitting control transistor T6 is electrically connected to the first electrode (eg, an anode) of the light-emitting element 500.

For example, as shown in FIG. 6, a seventh gate electrode of the second reset transistor T7 is configured to be electrically connected to the reset signal line Re to receive the reset signal, a seventh source electrode S7 of the second reset transistor T7 is electrically connected to the first electrode (eg, the anode) of the light-emitting element 500, a seventh drain electrode D7 of the second reset transistor T7 is configured to be electrically connected to the initial signal line Vinit to receive the initial signal. For example, the seventh drain electrode D7 of the second reset transistor T7 may be electrically connected to the initial signal line Vinit by being connected to the fourth source electrode S4 of the first reset transistor T4.

For example, as shown in FIG. 6, the storage capacitor Cst includes a first capacitor electrode CE1 and a second capacitor electrode CE2. The second capacitor electrode CE2 is electrically connected to the first voltage line VDD, and the first capacitor electrode CE1 is electrically connected to the first gate electrode G1 of the driving transistor T1 and the third drain electrode D3 of the threshold compensation transistor T3.

For example, as shown in FIG. 6, a second electrode (eg, a cathode) of the light-emitting element 500 is electrically connected to a second voltage line VSS.

It should be noted that, one of the first voltage line VDD and the second voltage line VSS provides a high voltage, and the other provides a low voltage. In the embodiment shown in FIG. 6, the first voltage line VDD provides a constant first voltage (eg, the above-mentioned first voltage signal), and the first voltage is a positive voltage. The second voltage line VSS provides a constant second voltage, and the second voltage may be a negative voltage and so on. For example, in some examples, the second voltage may be a ground voltage.

It should be noted that, according to the characteristics of transistors, transistors may be divided into N-type transistors and P-type transistors. For the sake of clarity, the embodiments of the present disclosure take a P-type transistor (for example, a P-type MOS transistor) as an example for description. That is, in the description of the present disclosure, the transistors T1-T7, etc. may all be P-type transistors. However, the transistors in the embodiments of the present disclosure are not limited to P-type transistors, and those skilled in the art may also use N-type transistors (eg, N-type MOS transistors) to implement the functions of one or more transistors in the embodiments of the present disclosure according to actual needs.

It should be noted that the transistors used in the embodiments of the present disclosure may be thin film transistors or field effect transistors or other switching elements with the same characteristics, and the thin film transistors may include oxide semiconductor thin film transistors, amorphous silicon thin film transistors or polysilicon thin film transistors, etc. The source electrode and the drain electrode of the transistor may be symmetrical in structure, so the physical structure of the source electrode and the drain electrode may be indistinguishable. The sources electrode and the drain electrode of all or part of the transistors in the embodiments of the present disclosure may be interchanged as required.

Figure 7A:
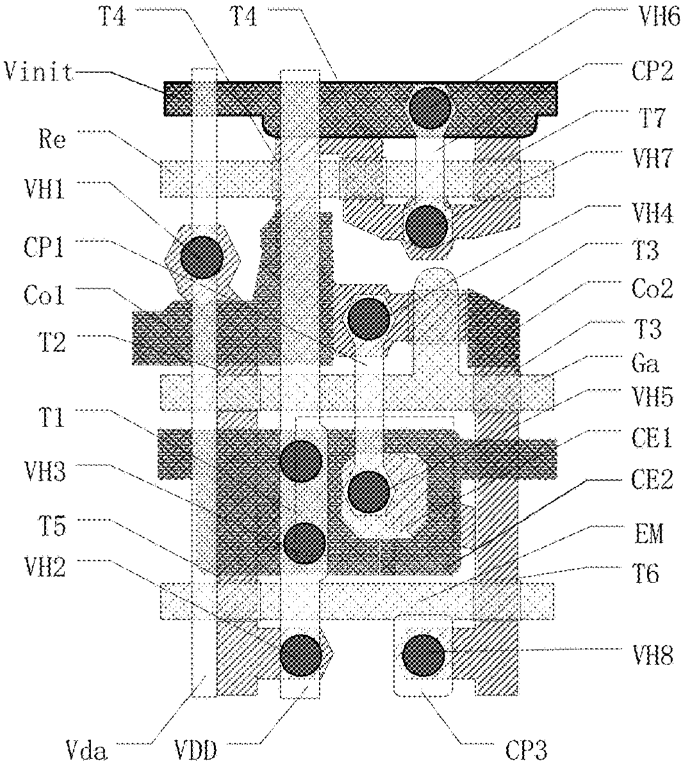
FIG. 7A is a schematic diagram of a stacking positional relationship of a semiconductor layer, a first conductive layer, a second conductive layer, and a third conductive layer of a pixel circuit provided by some embodiments of the present disclosure.

For example, FIG. 7A is a schematic diagram of the stacked positional relationship of the semiconductor layer, the first conductive layer, the second conductive layer, and the third conductive layer of the pixel circuit 400.

Figure 7B:
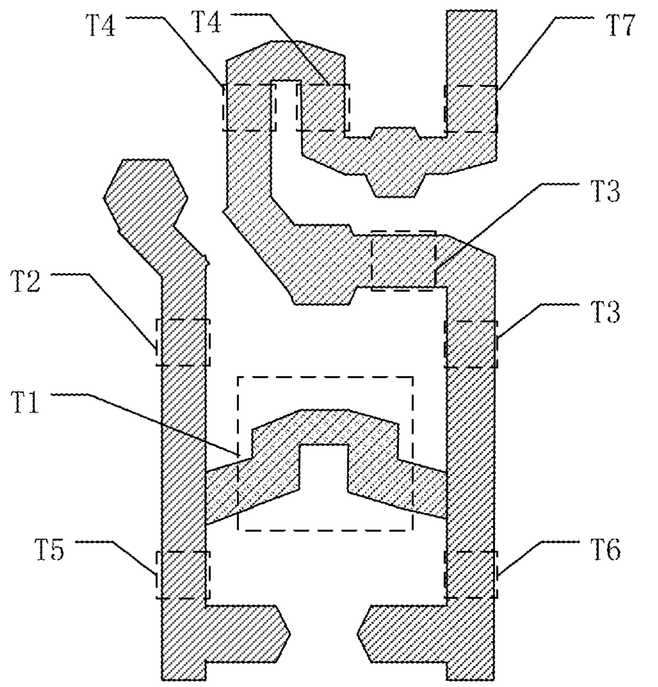
FIG. 7B shows a schematic diagram of a semiconductor layer of a pixel circuit provided by some embodiments of the present disclosure.
Figure 7C:
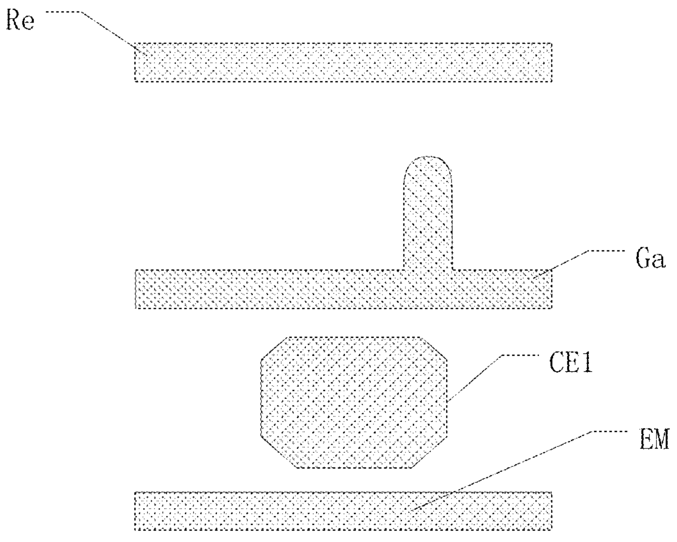
FIG. 7C shows a schematic diagram of a first conductive layer of a pixel circuit provided by some embodiments of the present disclosure.
Figure 7D:
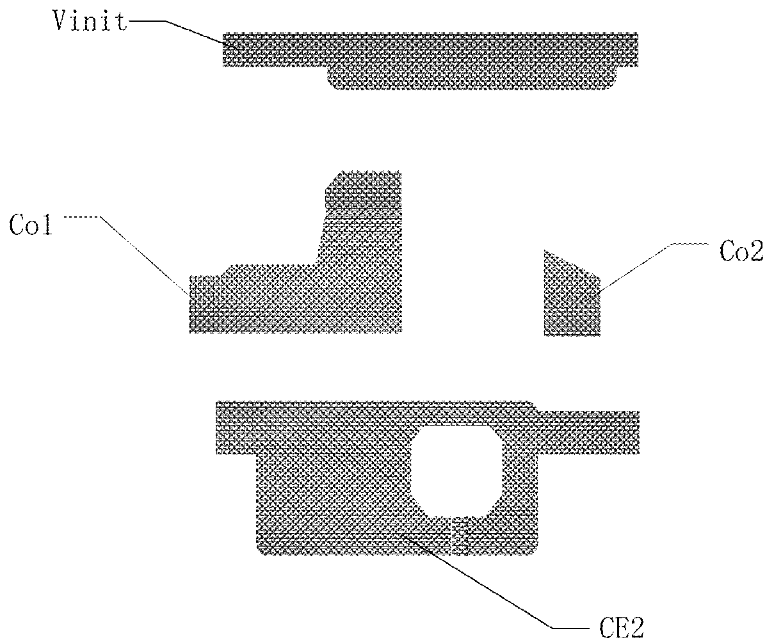
FIG. 7D shows a schematic diagram of a second conductive layer of a pixel circuit provided by some embodiments of the present disclosure.

FIG. 7B shows the semiconductor layer of the pixel circuit 400. As shown in FIG. 7B, the semiconductor layer may be formed by patterning a semiconductor material. The semiconductor layer may be used to manufacture an active layer of the above-mentioned driving transistor T1, an active layer of the above-mentioned data writing transistor T2, an active layer of the above-mentioned threshold compensation transistor T3, an active layer of the above-mentioned first reset transistor T4, an active layer of the above-mentioned first light-emitting control transistor T5, an active layer of the above-mentioned second light-emitting control transistor T6 and an active layer of the above-mentioned second reset transistor T7. Each active layer may include a source region, a drain region, and a channel region between the source region and drain region. For example, the semiconductor layer may be made of amorphous silicon, polysilicon, oxide semiconductor material and the like. It should be noted that, the above-mentioned source region and drain region may be regions doped with n-type impurities or p-type impurities.

In the display substrate provided by some embodiments according to the present disclosure, a gate insulating layer is formed on the above-mentioned semiconductor layer to protect the above-mentioned semiconductor layer.

FIG. 7C shows the first conductive layer of the pixel circuit 400. For example, as shown in FIG. 7C, the first conductive layer of the pixel circuit 400 is disposed on the gate insulating layer so as to be insulated from the semiconductor layer shown in FIG. 7B. The first conductive layer may include the first capacitor electrode CE1 of the storage capacitor Cst, the gate scanning signal line Ga, the reset signal line Re, the light-emitting control signal EM, the gate electrode of the driving transistor T1, the gate electrode of the data writing transistor T2, the gate electrode of the threshold compensation transistor T3, the gate electrode of the first reset transistor T4, the gate electrode of the first light-emitting control transistor T5, the gate electrode of the second light-emitting control transistor T6 and the gate electrode of the second reset transistor T7. As shown in FIG. 7C, the gate electrode of the data writing transistor T2, the gate electrode of the first reset transistor T4, the gate electrode of the first light-emitting control transistor T5, the gate electrode of the second light-emitting control transistor T6, and the gate electrode of the second reset transistor T7 are the portions where the gate scanning signal line Ga, the reset signal line Re and the semiconductor layer overlap. The threshold compensation transistor T3 may be a thin film transistor with a double gate structure, a gate electrode of the threshold compensation transistor T3 may be a portion where the gate scanning signal line Ga overlaps with the semiconductor layer, the other gate electrode of the threshold compensation transistor T3 may be a protrusion protruding from the gate scanning signal line Ga. The gate electrode of the driving transistor T1 may be the first capacitor electrode CE1. The first reset transistor T4 may be a thin film transistor with a double gate structure, and two gate electrodes of the first reset transistor T4 are respectively the overlapping portions of the reset signal line Re and the semiconductor layer.

In the display substrate provided in the present disclosure, a first interlayer insulating layer is formed on the first conductive layer for protecting the above-mentioned first conductive layer.

FIG. 7D shows the second conductive layer of the pixel circuit 400. For example, as shown in FIG. 7D, the second conductive layer of the pixel circuit 400 includes the second capacitor electrode CE2 of the storage capacitor Cst and the initial signal line Vinit. The second capacitor electrode CE2 and the first capacitor electrode CE1 at least partially overlap to form the storage capacitor Cst.

In some embodiments, the second conductive layer may further include a first light shielding portion Co1 and a second light shielding portion Co2. An orthographic projection of the first light shielding portion Co1 on the base substrate covers the active layer of the data writing transistor T2 and the active layer between the drain electrode of the threshold compensation transistor T3 and the drain electrode of the first reset transistor T4, thereby preventing external light from affecting the active layer of the data writing transistor T2, the active layer of the threshold compensation transistor T3 and the active layer of the first reset transistor T4. An orthographic projection of the second light shielding portion Co2 on the base substrate covers the active layer between the two gate electrodes of the threshold compensation transistor T3, thereby preventing external light from affecting the active layer of the threshold compensation transistor T3. The first light shielding portion Co1 may be integrated with the second light shielding portion Co2 of an adjacent pixel driving circuit, and is electrically connected to the first voltage line VDD through a via hole passing through the second interlayer insulating layer.

In the display substrate provided by some embodiments of the present disclosure, a second interlayer insulating layer is formed on the above-mentioned second conductive layer to protect the above-mentioned second conductive layer.

Figure 7E:
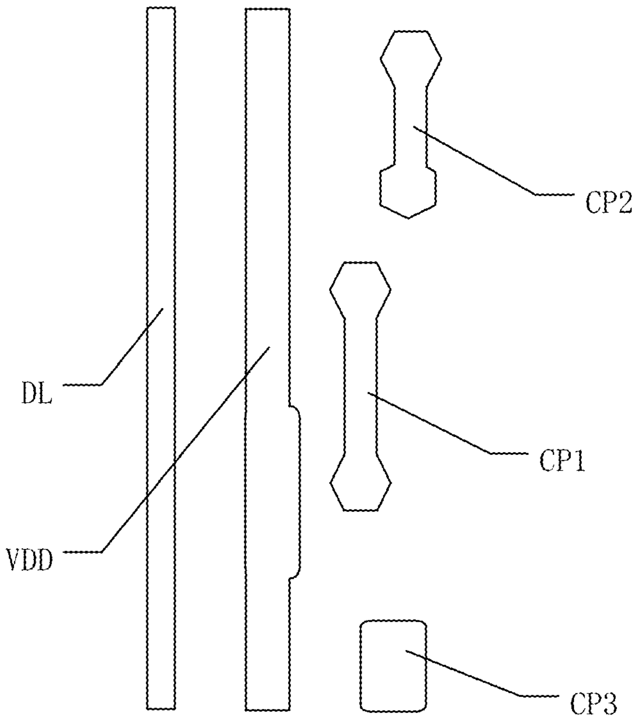
FIG. 7E shows a schematic diagram of a third conductive layer of a pixel circuit provided by some embodiments of the present disclosure.
Figure 7F:
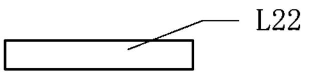
FIG. 7F shows a schematic diagram of a fourth conductive layer of a pixel circuit provided by some embodiments of the present disclosure.

FIG. 7E shows the third conductive layer of the pixel circuit 400. For example, as shown in FIG. 7E, the third conductive layer of the pixel circuit 400 includes the data line Vda and the first voltage line VDD. Refer to 7A and 7E, the data line Vda is connected to the source region of the data writing transistor T2 in the semiconductor layer through at least one via hole VH1 passing through the gate insulating layer, the first interlayer insulating layer and the second interlayer insulating layer. The first voltage line VDD is connected to the source region of the first light-emitting control transistor T5 in the semiconductor layer through at least one via hole VH2 passing through the gate insulating layer, the first interlayer insulating layer and the second interlayer insulating layer. The first voltage line VDD is connected to the second capacitor electrode CE2 in the second conductive layer through at least one via hole VH3 passing through the second interlayer insulating layer.

For example, the third conductive layer further includes a first connecting portion CP1, a second connecting portion CP2 and a third connecting portion CP3. An end of the first connecting portion CP1 is connected to the drain region of the threshold compensation transistor T3 in the semiconductor layer through at least one via hole VH4 passing through the gate insulating layer, the first interlayer insulating layer and the second interlayer insulating layer. The other end of the first connecting portion CP1 is connected to the gate electrode of the driving transistor T1 in the first conductive layer through at least one via hole VH5 passing through the first interlayer insulating layer and the second interlayer insulating layer. An end of the second connecting portion CP2 is connected to the initial signal line Vinit through a via hole VH6 passing through the second interlayer insulating layer, the other end of the second connecting portion CP2 is connected to the source region of the second reset transistor T7 in the semiconductor layer and the source region of the reset transistor T4 in the semiconductor layer through at least one via hole VH7 passing through the gate insulating layer, the first interlayer insulating layer and the second interlayer insulating layer. The third connecting portion CP3 is connected to the drain region of the second light-emitting control transistor T6 in the semiconductor layer through at least one via hole VH8 passing through the gate insulating layer, the first interlayer insulating layer and the second interlayer insulating layer.

In the display substrate provided by some embodiments of the present disclosure, a third interlayer insulating layer is formed on the above-mentioned third conductive layer to protect the above-mentioned third conductive layer.

For example, the first line and the second line are disposed on a side of the plurality of first voltage lines VDD away from the base substrate. For example, a fourth conductive layer may be disposed on the third interlayer insulating layer, and the first line and the second line may be disposed in the fourth conductive layer.

FIG. 7F shows the fourth conductive layer of the pixel circuit 400, and the fourth conductive layer is disposed on a side of the third interlayer insulating layer away from the third conductive layer. For example, as shown in FIG. 7F, the fourth conductive layer of the pixel circuit 400 includes the transfer electrode L22.

In the display substrate provided by some embodiments of the present disclosure, a fourth interlayer insulating layer is formed on the above-mentioned fourth conductive layer to protect the above-mentioned fourth conductive layer.

Figure 7G:
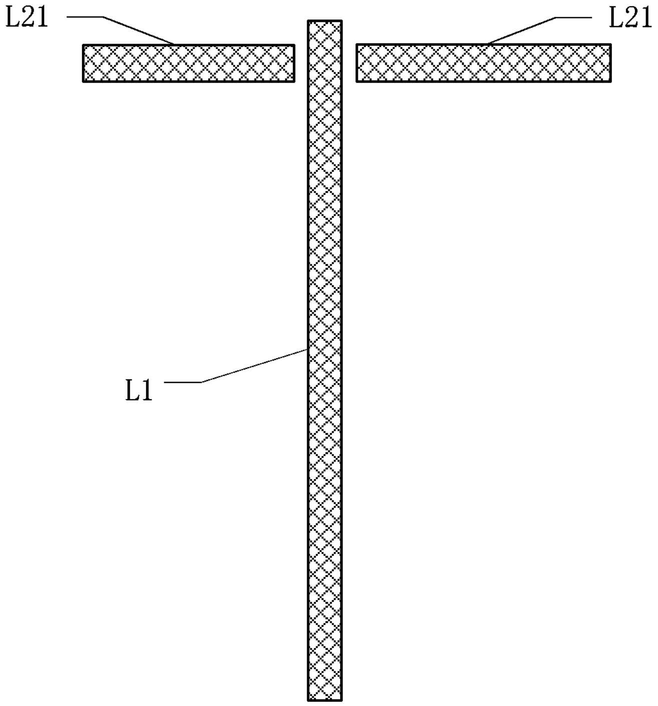
FIG. 7G shows a schematic diagram of a fifth conductive layer of a pixel circuit provided by some embodiments of the present disclosure.

FIG. 7G shows the fifth conductive layer of the pixel circuit 400. For example, as shown in FIG. 7Q the fifth conductive layer is disposed on a side of the fourth interlayer insulating layer away from the fourth conductive layer, the fifth conductive layer includes the first line L1 extending along the first direction Y and at least two connecting electrodes L21 extending along the second direction X. It should be noted that the first line L1 and the connecting electrode L21 belong to different connecting lines, respectively, for example, the first line L1 belongs to the connecting line connected to the pixel unit of the third row shown in FIG. 3, and the connecting electrode L21 belongs to the connecting line connected to the pixel unit in the first row. In order to avoid the intersection of the first line L1 with a second line of another connecting line, the second line is divided into at least two connecting electrodes L21, and the first line L1 passes through the gap between two adjacent connecting electrodes L21.

For example, the transfer electrode L22 may be connected to the at least two connecting electrodes L21 through a via hole passing through the fourth interlayer insulating layer to form a second line.

Figure 7H:
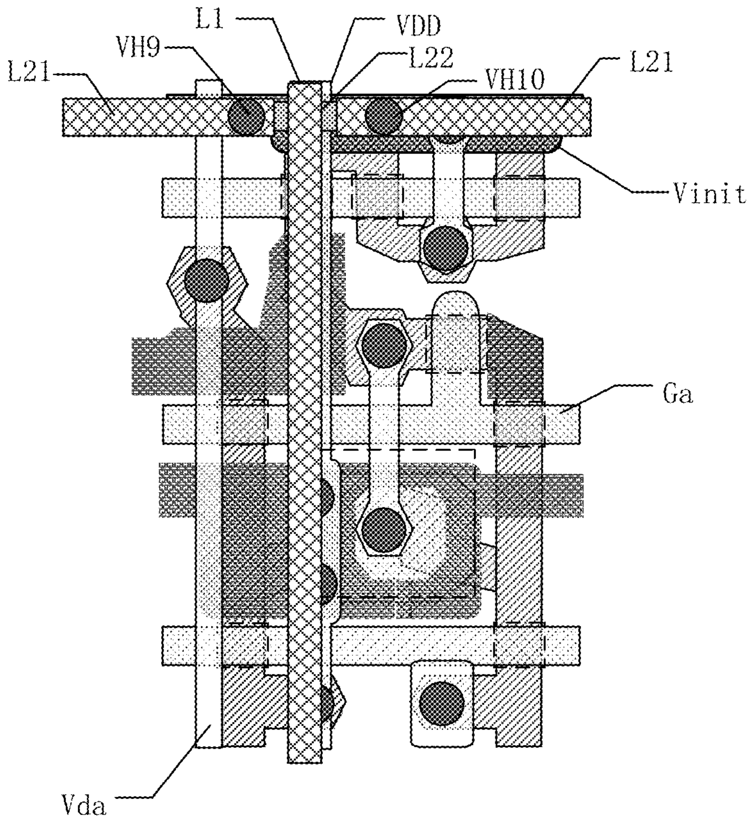
FIG. 7H shows a schematic diagram of a stacked positional relationship of the semiconductor layer, the first conductive layer, the second conductive layer, the third conductive layer, the fourth conductive layer, and the fifth conductive layer of the pixel circuit provided by some embodiments of the present disclosure.

FIG. 7H is a schematic diagram showing the lamination positional relationship of the semiconductor layer, the first conductive layer, the second conductive layer, the third conductive layer, the fourth conductive layer, and the fifth conductive layer. As shown in FIG. 7H, the orthographic projection of the first line L1 on the base substrate at least partially overlaps with the orthographic projection of the first voltage line VDD on the base substrate. The orthographic projection of the connecting electrode L21 on the base substrate at least partially overlaps the initial signal line Vinit. An orthographic projection of the transfer electrode L22 on the base substrate at least partially overlaps with the orthographic projection of the connecting electrode L21 on the base substrate, and the transfer electrode L22 is electrically connected to the connecting electrodes L21 in the fifth conductive layer through the via holes VH9 and V10 passing through the fourth interlayer insulating layer.

In the display substrate provided by some embodiments of the present disclosure, a protective layer is formed on the above-mentioned fifth conductive layer for protecting the above-mentioned fifth conductive layer. The first display electrode (eg, the anode) of the light-emitting element in the pixel unit may be disposed on the protective layer.

For example, in other examples, the fourth conductive layer may be the same layer as other conductive layers except the fifth conductive layer, that is, the transfer electrode L22 may be arranged in other conductive layers except the fifth conductive layer, the specific arrangement depends on the wiring of each layer, which is not limited in the embodiment of the present disclosure.

For example, in some other examples, the fourth conductive layer may also be disposed on a side of the fifth conductive layer away from the base substrate, that is, the transfer electrode L22 may be disposed on a side of the connecting electrode L21 away from the base substrate. The transfer electrode L22 may be flexibly set according to specific conditions, which is not limited in the embodiment of the present disclosure.

In other examples of the present disclosure, the type of any one or more of the transistors T1-T7 may be an oxide semiconductor thin film transistor (Oxide TFT), for example, the first reset transistor T4 may be an oxide semiconductor thin film transistor, the oxide semiconductor thin film transistor is, for example, an indium gallium zinc oxide (IGZO for short) thin film transistor. The oxide semiconductor thin film transistors have the characteristics of good hysteresis characteristics, low leakage current (below 1e-14 A), and low mobility. The oxide semiconductor thin film transistors can be used to ensure the stability of the gate voltage of the driving transistor. The types of the remaining transistors T1-T3 and T5-T7 may be polysilicon thin film transistors, such as low temperature polysilicon LTPS for short) thin film transistors. The oxide semiconductor thin film transistor and the polysilicon thin film transistor are disposed in different layers, so the active layer A4 of the first reset transistor T4 and the active layers A1-A3 and A5-A7 of the transistors T1-T3 and T5-T7 are disposed in different layers.

Figure 8:
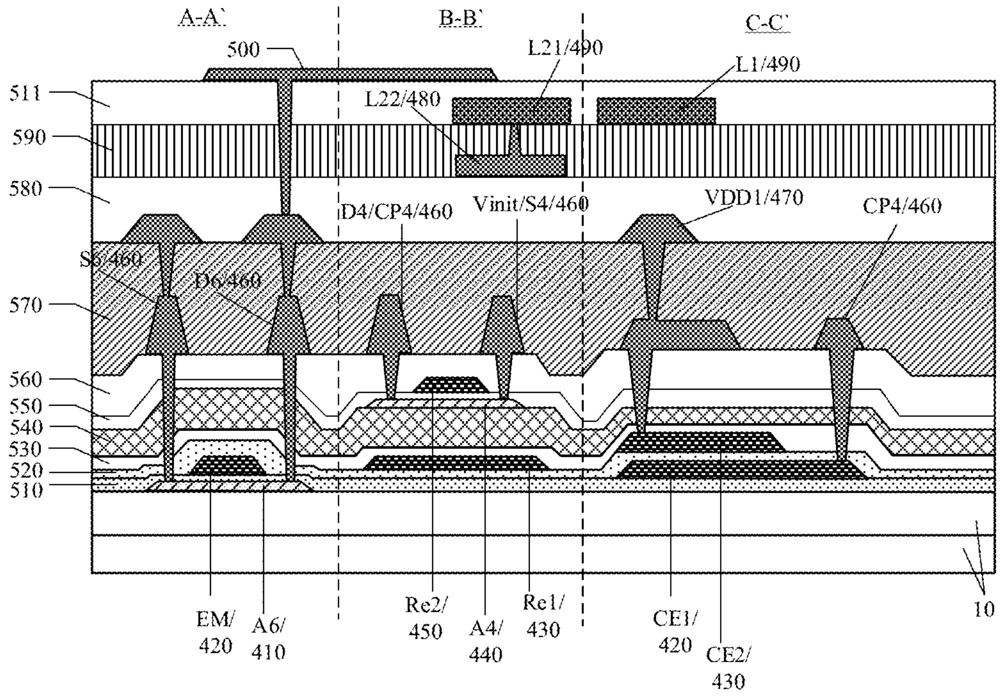
FIG. 8 shows a partial cross-sectional schematic diagram of another stacked structure of a pixel circuit provided by some embodiments of the present disclosure.

FIG. 8 shows a partial cross-sectional schematic diagram of another stacked structure of a pixel circuit provided by an embodiment of the present disclosure. FIG. 8 includes a splicing schematic diagram of three sections: part A-A', part B-B' and part C-C'. Part A-A' is a schematic diagram corresponding to the cross-sectional structure of the second light-emitting control transistor T6, part B-B' is a schematic diagram corresponding to the cross-sectional structure of the first reset transistor T4, part C-C' is a schematic diagram corresponding to the cross-sectional structure of the storage capacitor Cst.

For example, the stacked structure may include a first semiconductor layer 401, a first conductive layer 402, a second conductive layer 403, a second semiconductor layer 404, a third conductive layer 405, a source-drain metal layer 406, a fourth conductive layer 407, a fifth conductive layers 408 and a sixth conductive layer 409.

For example, the first semiconductor layer 401 may include active layers A1-A3 and A5-A7 of the transistors T1-T3 and T5-T7. The first conductive layer 402 may include the gate scanning signal line Ga, the light-emitting control signal line EM and the first capacitor electrode CE1. The second conductive layer 403 may include the second capacitor electrode CE2 and a first reset sub-signal line Re1. The second semiconductor layer 404 may include the active layer A4 of the first reset transistor T4. The third conductive layer may include a second reset sub-signal line Re2. The source-drain metal layer 406 may include the initial signal line Vinit, the source electrodes of the transistors T1-T7 and the drain electrodes of the transistors T1-T7. The fourth conductive layer 407 may include the data line Vda and the first voltage line VDD. The fifth conductive layer 408 may include the transfer electrode L22. The sixth conductive layer 409 may include the first line L1 and the connecting electrode L21.

For example, in some examples, the transfer electrode L22 is used to connect adjacent connecting electrodes L21. The orthographic projection of each transfer electrode L22 on the base substrate at least partially overlaps the orthographic projections of two adjacent connecting electrodes L21 on the base substrate. In another embodiment, the transfer electrodes L22 may be disposed in other conductive layers.

For example, at least one insulating layer may be arranged between every two adjacent layers of the first semiconductor layer 401, the first conductive layer 402, the second conductive layer 403, the second semiconductor layer 404, the third conductive layer 405, the source-drain metal layer 406, the fourth conductive layer 407, the fifth conductive layer and an anode layer (not shown). For example, as shown in FIG. 8, a first insulating layer 510 is disposed between the first semiconductor layer 401 and the first conductive layer 402, a second insulating layer 520 is disposed between the first conductive layer 402 and the second conductive layer 403, a third insulating layer 530 and a buffer layer 540 are disposed between the second conductive layer 403 and the second semiconductor layer 404, a fourth insulating layer 550 is disposed between the second semiconductor layer 404 and the third conductive layer 405, a fifth insulating layer 560 is disposed between the third conductive layer 405 and the source-drain metal layer 406, a sixth insulating layer 570 is disposed between the source-drain metal layer 406 and the fourth conductive layer 407, a seventh insulating layer 580 is disposed between the fourth conductive layer 407 and the fifth conductive layer 408, an eighth insulating layer 590 is disposed between the fifth conductive layer 408 and the sixth conductive layer 409, a planarization layer 511 is provided between the sixth conductive layer 409 and the anode layer.

For example, as shown in part A-A' of FIG. 8, the sixth source electrode S6 and the sixth drain electrode D6 of the second light-emitting control transistor T6 are disposed in the source-drain metal layer 406, the sixth source electrode S6 and the sixth drain electrode D6 are connected to the active layer A6 of the second light-emitting control transistor T4 in the first semiconductor layer 401 through a via hole passing through the insulating layers (eg, passing through the first insulating layer 550 to the fifth insulating layer 560 and the buffer layer 540). The sixth drain electrode D6 is connected to the anode of the light-emitting element 500 through a via hole passing through the insulating layers (eg, passing through the sixth insulating layer 560 to the eighth insulating layer 590 and the planarization layer 511). The gate electrode of the second light-emitting control transistor T6 is integrally formed with the light-emitting control signal line EM.

For example, as shown in part B-B' of FIG. 8, the initial signal line Vinit is integrally formed with the fourth source electrode S4 of the first reset transistor T4, and is connected to the active layer A4 of the first reset transistor T4 in the second semiconductor layer 404 through a via hole passing through the insulating layers (eg, passing through the fourth insulating layer 550 and the fifth insulating layer 560). The fourth drain electrode D4 of the first reset transistor T4 is connected to the source layer A4 of the first reset transistor T4 in the second semiconductor layer 404 through a via hole passing through the insulating layers (eg, passing through the fourth insulating layer 550 and the fifth insulating layer 560).

For example, as shown in part B-B' of FIG. 8, the first reset transistor T4 may be a double gate structure, including a first gate electrode and a second gate electrode. The first reset sub-signal line Re1 is integrally formed with the first gate electrode of the first reset transistor T4, the second reset sub-signal line Re2 is integrally formed with the second gate electrode of the first reset transistor T4.

For example, as shown in part B-B' of FIG. 8, the connecting electrode L21 of the second line at least partially overlaps with the initial signal line Vinit in the direction perpendicular to the base substrate.

For example, as shown in part C-C' of FIG. 8, the first voltage line VDD is disposed in the fourth conductive layer 407, and the first voltage line VDD is connected to the second capacitor electrode CE2 in the second conductive layer 402 through a via hole passing through the insulating layer (eg, passing through the third insulating layer 530 to the sixth insulating layer 570 and the buffer layer 540). The first capacitor electrode CE1 is connected to the gate electrode of the driving transistor T1 through the fourth connecting portion CP4, that is, connected to the drain electrode D4 of the first reset transistor T4. The fourth connecting portion CP4 is connected to the first capacitor electrode CE1 through a via hole passing through the insulating layers (eg, passing through the second insulating layer 520 to the sixth insulating layer 570 and the buffer layer 540).

For example, as shown in part C-C' of FIG. 8, the first line L1 and the first voltage line VDD at least partially overlap in the direction perpendicular to the base substrate.

For example, in addition to the pixel circuit with the 7T1C structure in the above embodiment, the pixel circuit may also be a pixel circuit with other structures, for example, the pixel circuit may be a pixel circuit with 8T1C structure, 5T1C structure, 6T2C structure or 4T2C structure. The embodiment does not limit this.

It should be noted that, for the introduction of the first gate driving circuit and the second gate driving circuit, reference may be made to the specific description of the structure and working principle in the art, and details are not repeated here. For example, in the embodiments of the present disclosure. The sizes of the shift register units (eg, the sizes of transistors and capacitors) in the first gate driving circuit located in the second peripheral sub-region and the second gate driving circuit located in the second peripheral sub-region may be correspondingly compressed so that the second peripheral sub-region can arrange the shift register units driving all rows of pixel units of the display region.

Figure 9:
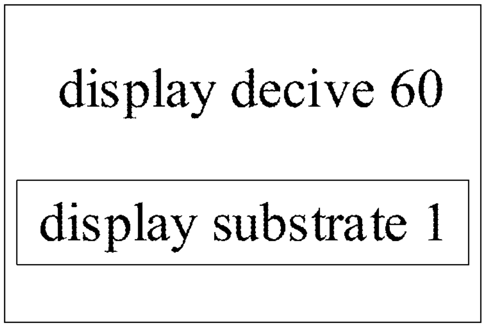
FIG. 9 is a schematic diagram of a display device provided by at least one embodiment of the present disclosure.

At least one embodiment of the present disclosure further provides a display device. FIG. 9 is a schematic diagram of the display device according to at least one embodiment of the present disclosure. As shown in FIG. 9, the display device 60 includes the display substrate 1 provided by any embodiment of the present disclosure, for example, the display substrate 1 shown in FIG. 1.

For example, the display device 60 may be a liquid crystal display device or an organic light-emitting diode (OLED) display device or the like. For example, in the case that the display device 60 is a liquid crystal display device, the display substrate 1 may be an array substrate or a color filter substrate. In the case that the display device 60 is an organic light-emitting diode display device, the display substrate 1 may be an array substrate.

For example, the display device 60 may include a rectangular panel, a circular panel, an oval panel, a polygonal panel, or the like. In addition, the display device 60 may include a flat panel, a curved panel, or even a spherical panel.

For example, the display device 60 may also have a touch function, that is, the display device 60 may be a touch display device.

For example, the display device 60 may be applied to any product or component with a display function, such as a mobile phone, a tablet computer, a television, a monitor, a notebook computer, a digital photo frame, a navigator, and the like.

For example, the display device 60 may be a flexible display device, so as to meet various practical application requirements, for example, the display device 60 may be applied to a curved screen and the like.

It should be noted that the display device 60 may further include other components, such as a data driving circuit, a timing controller, and the like, which are not limited in the embodiments of the present disclosure. For the sake of clarity and conciseness, the embodiments of the present disclosure do not show all the constituent units of the display device 60. In order to realize the basic functions of the display device 60, those skilled in the art may provide or set other structures not shown according to specific needs, which are not limited by the embodiments of the present disclosure.

Figure 10:
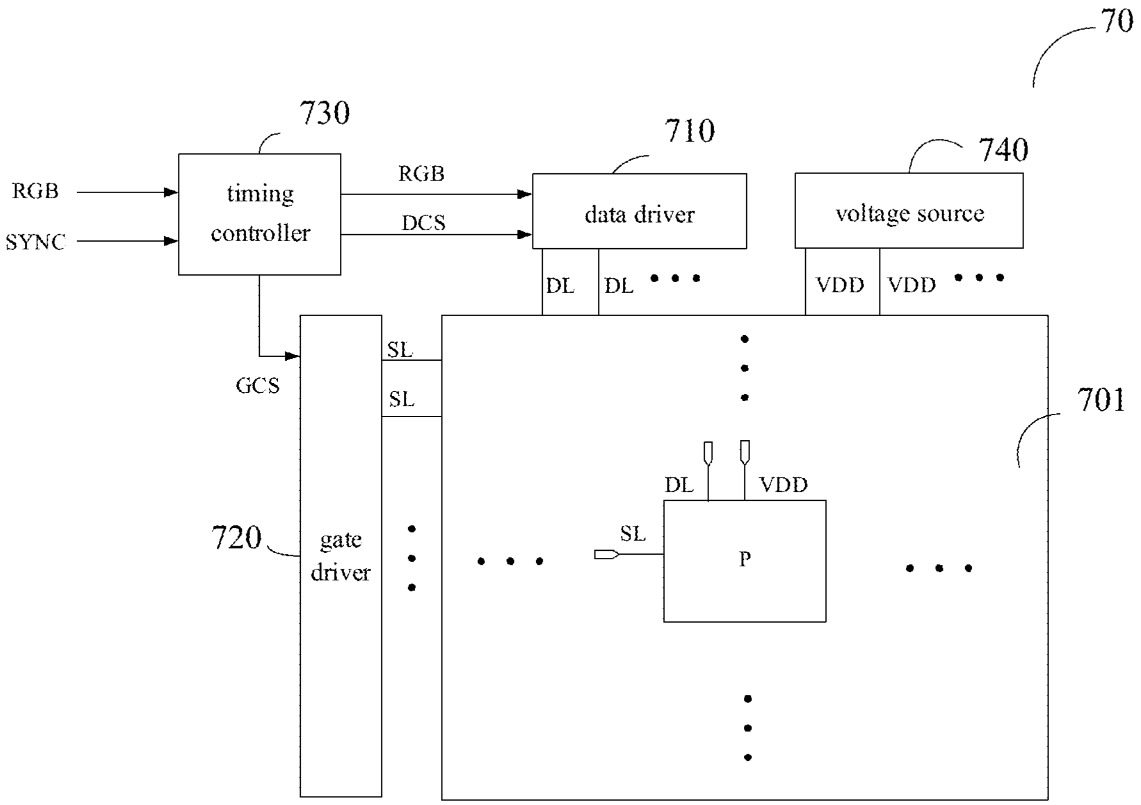
FIG. 10 is a schematic block diagram of another display device provided by some embodiments of the present disclosure.

FIG. 10 is a schematic block diagram of another display device provided by some embodiments of the present disclosure. For example, as shown in FIG. 10, the display device 70 includes a display substrate 701, and the display substrate 701 may be the display substrate provided in any embodiment of the present disclosure.

For example, as shown in FIG. 10, the display device 70 further includes a data driver 710, a gate driver 720, a timing controller 730, a voltage source 740, and the like. For example, the gate driver 720 may include the first gate scanning circuit and the second gate scanning circuit in the above-mentioned embodiments about the display substrate, that is, the gate driver 720 may be directly fabricated on the base substrate through semiconductor process. The voltage source 740 may be implemented as a power management circuit, for example.

For example, in one example, a plurality of pixel units P (for example, the pixel units 130 in the above-mentioned embodiment about the display substrate 1) are arranged in an array in the display region of the display substrate 701. Each pixel unit P receives the data signal provided by the data driver 710 through the data line Vda, and receives the voltage signal provided by the voltage source 740 through the first voltage line VDD. For example, the voltage line VDD may include, for example, the first voltage line 183 in the above-described embodiment about the display substrate 1.

For example, the data driver 710 converts digital image data RGB input from the timing controller 730 into data signal according to a data control signal DCS provided from the timing controller 730. For example, the data driver 710 converts the data signal into an analog voltage signal according to the data control signal DCS provided by the timing controller 730, performs processing such as operational amplification on the analog voltage signal, and then provides corresponding data signals to each pixel unit P through the data line Vda. For example, the data driver 710 may be implemented as a semiconductor chip.

For example, the gate driver 720 is electrically connected to each pixel unit P through gate scanning signal lines SL to provide each pixel unit P with a gate scanning signal, respectively. For example, the gate driver 720 provides strobe signals according to a plurality of scanning control signals GCS provided by the timing controller 730. For example, the gate driver 720 may be implemented as a semiconductor chip, and may also be integrated in the display device 70 to form a GOA circuit, such as the first gate driving circuit and the second gate driving circuit in the above-described embodiment of the display substrate 1.

For example, the timing controller 730 is used to process image data RGB input from the outside of the display device 70, supply processed image data RGB to the data driver 710, and supply the data driver 710 and the gate driver 720 with the data control signal DCS and the scanning control signal GCS, to control the data driver 710 and the gate driver 720.

For example, the timing controller 730 processes externally inputted image data RGB to match the size and resolution of the display device 70 and then provides the processed image data RGB to the data driver 710. The timing controller 730 generates scanning control signals GCS and data control signals DCS using synchronization signals SYNC (eg, dot clock DCLK, data enable signal DE, horizontal synchronization signal Hsync, and vertical synchronization signal Vsync) input from outside the display device 70. The timing controller 730 provides the generated data control signal DCS and scanning control signal GCS to the data driver 710 and the gate driver 720, respectively, for the control of the data driver 710 and the gate driver 720.

For the structures, functions, and technical effects of the display device 60 and the display device 70 provided by the embodiments of the present disclosure, reference may be made to the corresponding descriptions in the display substrate 1 provided by the above-described embodiments of the present disclosure, which will not be repeated here.

For example, the display device 60 and the display device 70 provided by the embodiments of the present disclosure may be organic light-emitting diode display devices. Alternatively, the display device 60 and the display device 70 provided by the embodiments of the present disclosure may also be devices with display function such as quantum dot light-emitting diode display devices, electronic paper display devices, or other types of display devices, which are not limited in the embodiments of the present disclosure.

For example, the display device 60 and the display device 70 provided by the embodiments of the present disclosure may be any products or components with display function, such as display substrates, display panels, electronic paper, mobile phones, tablet computers, televisions, monitors, notebook computers, digital cameras, navigators, and so on, which are not limited by the embodiments of the present disclosure.

The following should be noted:

(1) Only the structures involved in the embodiments of the present disclosure are illustrated in the drawings of the embodiments of the present disclosure, and other structures can refer to usual designs;

(2) For clarity, in the drawings used to describe the embodiments of the present disclosure, the thickness of layers or regions is enlarged or reduced, that is, these drawings are not drawn to actual scale. It can be understood that when an element such as a layer, film, region or substrate is said to be "above" or "below" another element, the element may be "directly" above or "below" another element or intermediate elements may be present.

(3) The embodiments and features in the embodiments of the present disclosure may be combined in case of no conflict to acquire new embodiments.

What have been described above merely are exemplary embodiments of the present disclosure, and not intended to define the scope of the present disclosure, and the scope of the present disclosure is determined by the appended claims.

What is claimed is:

1. A display substrate, comprising a base substrate, wherein the base substrate comprises a display region and a peripheral region on at least one side of the display region, wherein the display region comprises a plurality of rows and a plurality of columns of pixel units arranged in an array, a plurality of gate scanning signal lines respectively connected to the plurality of rows of pixel units, and a plurality of connecting lines in different layers from the plurality of gate scanning signal lines;

the peripheral region comprises a first peripheral sub-region and a second peripheral sub-region, the display region comprises a first display sub-region corresponding to the first peripheral sub-region and a second display sub-region corresponding to the second peripheral sub-region, and the second display sub-region is different from the first display sub-region;

the second peripheral sub-region comprises a first gate driving circuit, and the first gate driving circuit is configured to be connected to a plurality of gate scanning signal lines in the first display sub-region through the plurality of connecting lines in the display region, to respectively providing gate scanning signals to a plurality of rows of pixel units in the first display sub-region; and the first peripheral sub-region does not comprise the first gate driving circuit;

wherein the second peripheral sub-region further comprises a second gate driving circuit, and the second gate driving circuit is configured to be connected to a plurality of gate scanning signal lines in the second display sub-region, to respectively providing the gate scanning signal to a plurality of rows of pixel units in the second display sub-region; and the first peripheral sub-region does not comprise the second gate driving circuit;

wherein each of the plurality of connecting lines comprises a first line extending in a first direction and a second line extending in a second direction, the first direction intersects the second direction; and the first gate driving circuit is connected to the first line through the second line, and the first line is connected to a corresponding gate scanning signal line in the first display sub-region through a via hole passing through an insulating layer, to providing the gate scanning signal to the corresponding gate scanning signal line.

2. The display substrate according to claim 1, wherein in a case where the second line overlaps with a first line of other connecting lines, and the second line comprises at least one transfer electrode and a plurality of connecting electrodes;

the plurality of connecting electrodes and the first line are in a same layer, and the at least one transfer electrode and the plurality of connecting electrodes are in different layers;

the at least one transfer electrode and the first line of the other connecting lines at least partially overlap in a direction perpendicular to the base substrate; and the plurality of connecting electrodes are connected to the at least one transfer electrode through a via hole passing through an insulating layer to form the second line.

3. The display substrate according to claim 1, wherein an orthographic projection of the first line on the base substrate is between orthographic projections of two adjacent columns of pixel units in the display region on the base substrate.

4. The display substrate according to claim 1, wherein an orthographic projection of the second line on the base substrate is between orthographic projections of two adjacent rows of pixel units in the display region on the base substrate.

5. The display substrate according to claim 2, wherein the display region further comprises a plurality of first voltage lines, and the plurality of first voltage lines are respectively connected to the plurality of columns of pixel units and extend along the first direction, so as to respectively provide a first voltage to the plurality of columns of pixel units; and an orthographic projection of the first line on the base substrate and an orthographic projection of a first voltage line, which corresponds to the first line, on the base substrate at least partially overlap.

6. The display substrate according to claim 5, wherein the display region further comprises a plurality of initial signal lines, and the plurality of initial signal lines are respectively connected to the plurality of rows of pixel units and extend along the second direction, so as to respectively provide an initial voltage to the plurality of rows of pixel units; and an orthographic projection of the second line on the base substrate and an orthographic projection of an initial signal line, which corresponds to the second line, on the base substrate at least partially overlap.

7. The display substrate according to claim 6, wherein each of the plurality of rows and the plurality of columns of pixel units comprises a light-emitting element and a pixel circuit driving the light-emitting element to emit light, and the pixel circuit comprises a driving sub-circuit, a data writing sub-circuit, a threshold compensation sub-circuit and a reset sub-circuit;

the driving sub-circuit comprises a control terminal, a first terminal and a second terminal, and the driving sub-circuit is configured to control a driving current flowing through the light-emitting element;

the data writing sub-circuit is connected to the first terminal of the driving sub-circuit, a data line and the gate scanning signal line, and the data writing sub-circuit is configured to write a data signal provided by the data line into the first terminal of the driving sub-circuit in response to the gate scanning signal provided by the gate scanning signal line;

the threshold compensation sub-circuit is connected to the control terminal and the second terminal of the driving sub-circuit, the first voltage line and the gate scanning signal line, and the threshold compensation sub-circuit is configured to compensate the driving sub-circuit in response to the gate scanning signal provided by the gate scanning signal line and a written data signal; and the reset sub-circuit is connected to the second terminal of the driving sub-circuit, the initial signal line and a reset signal line, and the reset sub-circuit is configured to applying the initial voltage provided by the initial signal line to the second terminal of the driving sub-circuit in response to a reset signal provided by the reset signal line.

8. The display substrate according to claim 7, further comprising a semiconductor layer, a first conductive layer, a second conductive layer and a third conductive layer that are sequentially stacked in a direction perpendicular to the base substrate, wherein the pixel circuit comprises a thin film transistor and a storage capacitor;

the thin film transistor comprises a gate electrode, a source electrode, a drain electrode and a source and drain region corresponding to the source electrode and the drain electrode, and the storage capacitor comprises a first capacitor electrode and a second capacitor electrode opposite to the first capacitor electrode in a direction perpendicular to a board surface of the base substrate;

the semiconductor layer comprises the source and drain region;

the first conductive layer comprises the gate electrode of the thin film transistor, the first capacitor electrode of the storage capacitor and the gate scanning signal line, the second conductive layer comprises the initial signal line and the second capacitor electrode of the storage capacitor; and the third conductive layer comprises the first voltage line, the source electrode and the drain electrode.

9. The display substrate according to claim 8, further comprising a fourth conductive layer, wherein the fourth conductive layer comprises the at least one transfer electrode.

10. The display substrate according to claim 8, further comprising a fifth conductive layer, wherein, the fifth conductive layer comprises the first line and the second line.

11. The display substrate according to claim 1, wherein the plurality of rows of pixel units in the first display sub-region are arranged in a stepped shape in the first direction.

12. The display substrate according to claim 1, wherein a number of pixel units in each row in the first display sub-region is less than or equal to a number of pixel units in each row in the second display sub-region.

13. A display device, comprising the display substrate according to claim 1.

14. The display device according to claim 13, wherein the peripheral region of the display substrate further comprises a third peripheral sub-region, the first peripheral sub-region is between the second peripheral sub-region and the third peripheral sub-region;

the second peripheral sub-region comprises a first straight edge portion extending in a first direction, the third peripheral sub-region comprises a second straight edge portion extending in a second direction, and the first peripheral sub-region comprises a corner edge portion connecting the first straight edge portion and the second straight edge portion; and the first direction intersects the second direction.

15. The display device according to claim 14, wherein the display substrate comprises a display side and a non-display side; and the first straight edge portion and the second straight edge portion are configured to be bendable in a direction toward the non-display side.

16. The display device according to claim 14, wherein the corner edge portion comprises an arcuate edge portion.

17. The display device according to claim 14, wherein the display substrate comprises a display side and a non-display side, and the corner edge portion is configured to be bendable in a direction toward the non-display side.

18. The display substrate according to claim 2, wherein an orthographic projection of the first line on the base substrate is between orthographic projections of two adjacent columns of pixel units in the display region on the base substrate.

* * * * *